US012769728B2

(12) United States Patent
Russak et al.

(10) Patent No.: US 12,769,728 B2
(45) Date of Patent: Oct. 20, 2026

(54) BETTER INFERENCE PATTERN FOR LONG CONTEXT RETRIEVAL

(71) Applicant: Writer, Inc., San Francisco, CA (US)

(72) Inventors: Melisa Russak, Wroclaw (PL); Umar Jamil, London (GB); Axel Magnuson, Seattle, WA (US); Mateusz Russak, Wroclaw (PL); Waseem AlShikh, Boca Raton, FL (US); Kiran Kamble, Karnataka (IN)

(73) Assignee: Writer, Inc., San Francisco, CA (US)

( * ) Notice: Subject to any disclaimer, the term of this patent is extended or adjusted under 35 U.S.C. 154(b) by 0 days.

(21) Appl. No.: 19/263,182

(22) Filed: Jul. 8, 2025

(65) Prior Publication Data

US 2026/0050589 A1 Feb. 19, 2026

Related U.S. Application Data

(60) Provisional application No. 63/684,291, filed on Aug. 16, 2024.

(51) Int. Cl.
*G06F 16/242* (2019.01)
*G06F 40/284* (2020.01)
*G06F 40/40* (2020.01)

(52) U.S. Cl.
CPC .......... *G06F 16/243* (2019.01); *G06F 40/284* (2020.01); *G06F 40/40* (2020.01)

(58) Field of Classification Search
None
See application file for complete search history.

(56) References Cited

U.S. PATENT DOCUMENTS

2025/0251932 A1* 8/2025 Hensley .................. G06F 16/31
2025/0335715 A1* 10/2025 Kumaresan ....... G06F 16/24522
(Continued)

FOREIGN PATENT DOCUMENTS

CN 119621951 A * 3/2025 ......... G06F 16/3329
WO WO-2025042784 A1 * 2/2025 ............. G06F 40/30

OTHER PUBLICATIONS

Chang K, Xu S, Wang C, Luo Y, Liu X, Xiao T, Zhu J. Efficient prompting methods for large language models: A survey. arXiv preprint arXiv:2404.01077. Apr. 1, 2024. (Year: 2024).*
(Continued)

*Primary Examiner* — Uyen T Le
(74) *Attorney, Agent, or Firm* — Mughal Gaudry & Franklin PC

(57) ABSTRACT

The present disclosure relates to a method and system for enhancing inference in large language models (LLMs) over long input sequences. A segmented inference strategy may be employed, wherein the long context can be divided and sequentially processed through a key-value (KV) cache of the LLM. At each step, the model may generate auxiliary outputs (or margins), which may include extractive summaries or intermediate signals based on the segment's relevance to an instruction. These margins may then be classified and selectively retained to guide final inference on the instruction. The retained margins may be prepended to the instruction to facilitate improved generation without modifying the model's internal weights. The disclosed approach provides efficient localization of relevant content, improves comprehension of extended contexts, and reduces computational overhead. Moreover, the disclosed technique is particularly effective for retrieval-based NLP tasks and supports long-context reasoning in LLMs while enhancing inference efficiency and user experience.

20 Claims, 13 Drawing Sheets

(56) References Cited

U.S. PATENT DOCUMENTS

2025/0371279 A1* 12/2025 Zhang .................... G06F 40/35
2025/0371381 A1* 12/2025 Choukse ............... G06F 9/5066

OTHER PUBLICATIONS

Abdin, Marah et al. (2024). Phi-3 Technical Report: A Highly Capable Language Model Locally on Your Phone. arXiv: 2404. 14219 [cs.CL]. URL: https://arxiv.org/abs/ 2404.14219.
Agrawal, Amey et al. (2023). Sarathi: Efficient LLM Inference by Piggybacking Decodes with Chunked Prefills. arXiv: 2308.16369 [cs.LG]. URL: https://arxiv.org/abs/ 2308.16369.
Anil, Cem et al. (2022). Exploring Length Generalization in Large Language Models. arXiv: 2207.04901 [cs.CL].
Bai, Yushi et al. (2024). LongBench: A Bilingual, Multitask Benchmark for Long Context Understanding. arXiv: 2308.14508 [cs.CL]. URL: https://arxiv.org/abs/2308.14508.
Besta, Maciej et al. (Mar. 2024). "Graph of Thoughts: Solving Elaborate Problems with Large Language Models". In: Proceedings of the AAAI Conference on Artificial Intelligence 38.16, 17682-17690. ISSN: 2159-5399. DOI: 10.1609/aaai.v38i16.29720. URL: http://dx.doi.org/10.1609/aaai.v38i16.29720.
Bird, Steven, Ewan Klein, and Edward Loper (2009). Natural language processing with Python: analyzing text with the natural lan-guage toolkit. O'Reilly Media, Inc.
Chase, Harrison (Oct. 2022). LangChain. https://github.com/langchain-ai/langchain.
Chen, Mark et al. (2021). Evaluating Large Language Models Trained on Code. arXiv: 2107. 03374 [cs.LG].
Chen, Yukang et al. (2024). LongLoRA: Efficient Fine-tuning of Long-Context Large Language Models. arXiv: 2309.12307 [cs.CL]. URL: https://arxiv.org/abs/2309.12307.
Daelemans, Walter, Antal van den Bosch, and Jakub Zavrel (1998). Forgetting Exceptions is Harmful in Language Learning. arXiv: cs / 9812021 [cs.CL].
Dai, Zihang et al. (2019a). Transformer-XL: Attentive Language Models Beyond a Fixed-Length Context. arXiv: 1901.02860 [cs. LG]. URL: https://arxiv.org/abs/1901.02860.
Dubey, Abhimanyu et al. (2024). The Llama 3 Herd of Models. arXiv: 2407.21783 [cs.AI]. URL: https://arxiv.org/abs/2407.21783.
Févry, Thibault et al. (2020). Entities as Experts: Sparse Memory Access with Entity Supervision. arXiv: 2004.07202 [cs.CL].
Ge, Tao et al. (2024). In-context Autoencoder for Context Compression in a Large Language Model. arXiv: 2307.06945 [cs.CL]. URL: https://arxiv.org/abs/2307.06945.
Hsieh, Cheng-Ping et al. (2024). Ruler: What's the Real Context Size of Your Long-Context Language Models? arXiv: 2404.06654. [cs.CL]. URL: https://arxiv.org/abs/2404.06654.
Ivgi, Maor, Uri Shaham, and Jonathan Berant (2023). "Efficient long-text understanding with short-text models". In: Transactions of the Association for Computational Linguistics 11, pp. 284-299.
Izacard, Gautier and Edouard Grave (2020). "Leveraging passage retrieval with generative models for open domain question answering". In: arXiv preprint arXiv:2007.01282.
Khandelwal, Urvashi et al. (2020). Generalization through Memorization: Nearest Neighbor Lan-guage Models. arXiv: 1911.00172 [cs.CL]. Austin, Jacob et al. (2021). Program Synthesis with Large Language Models. arXiv: 2108.07732 [cs.PL].
Kryscinski, Wojciech et al. (2022). BookSum: A Collection of Datasets for Long-form Narrative Summarization. arXiv: 2105. 08209 [cs.CL]. URL: https://arxiv.org/abs/2105.08209.
Kwon, Woosuk et al. (2023). Efficient Memory Management for Large Language Model Serving with PagedAttention. arXiv: 2309. 06180 [cs.LG]. URL: https://arxiv.org/abs/2309.06180.
Lewis, Patrick et al. (2021). Retrieval-Augmented Generation for Knowledge-Intensive NLP Tasks. arXiv: 2005.11401 [cs.CL].
Li, Jiaqi et al. (2023). LooGLE: Can Long-Context Language Models Understand Long Contexts? arXiv: 2311.04939 [cs. CL]. Url: https://arxiv.org/abs/2311.04939.
Liu, Nelson F. et al. (2023). Lost in the Middle: How Language Models Use Long Contexts. arXiv: 2307 .03172 [cs.CL]. URL: https://arxiv.org/abs/2307.03172.
Liu, Qi, Dani Yogatama, and Phil Blunsom (2022). Relational Memory Augmented Language Models. arXiv: 2201.09680 [cs. CL].
Mohtashami, Amirkeivan and Martin Jaggi (2023). Landmark Attention: Random-Access Infinite Context Length for Transformers. arXiv: 2305 . 16300 [cs.CL]. URL: https:/arxiv.org/abs/2305.16300.
Mu, Jesse, Xiang Lisa Li, and Noah Goodman (2024). Learning to Compress Prompts with Gist Tokens. arXiv: 2304.08467 [cs.CL]. URL: https://arxiv.org/abs/2304.08467.
Munkhdalai, Tsendsuren et al. (2019). Metalearned Neural Memory. arXiv: 1907.09720 [cs.NE]. URL: https://arxiv.org/abs/ 1907. 09720.
Munkhdalai, Tsendsuren, Manaal Faruqui, and Siddharth Gopal (2024). Leave No Context Behind: Efficient Infinite Context Transformers with Infini-attention. arXiv: 2404.07143 [cs.CL]. URL: https://arxiv.org/abs/2404.07143.
Nye, Maxwell et al. (2021). Show Your Work: Scratchpads for Intermediate Computation with Language Models. arXiv: 2112. 00114 [cs.LG].
Peng, Bowen et al. (2023). YaRN: Efficient Context Window Extension of Large Language Models. arXiv: 2309.00071 [cs.CL]. URL: https://arxiv.org/abs/2309.00071.
Rajpurkar, Pranav, Robin Jia, and Percy Liang (2018). Know What You Don't Know: Unanswerable Questions for SQuAD. arXiv: 1806. 03822 [cs.CL]. URL: https://arxiv.org/abs/1806.03822.
Ratner, Nir et al. (2022). "Parallel context windows improve in-context learning of large language models". In: arXiv preprint arXiv:2212.10947.
Schlag, Imanol, Tsendsuren Munkhdalai, and Jürgen Schmidhuber (2021). Learning Associative Inference Using Fast Weight Memory. arXiv: 2011 .07831 [cs.LG]. URL: https://arxiv.org/abs/2011. 07831.
Shaham, Uri et al. (2023). ZeroScrolls: A Zero-Shot Benchmark for Long Text Understanding. arXiv: 2305 .14196 [cs.CL]. URL: https://arxiv.org/abs/2305.14196.
Su, Jianlin (2023). NBCE: Handling Length in Context Expansion of LLM with Naive Bayes. https://spaces.ac.cn/archives/9617.
Su, Jianlin et al. (2023). RoFormer: Enhanced Transformer with Rotary Position Embedding. arXiv: 2104 .09864 [cs.CL]. Url: https://arxiv.org/abs/2104.09864.
Tang, Yixuan and Yi Yang (2024). MultiHop-RAG: Benchmarking Retrieval-Augmented Generation for Multi-Hop Queries. arXiv: 2401.15391 [cs.CL]. URL: https://arxiv.org/abs/2401.15391.
Tworkowski, Szymon et al. (2023). Focused Transformer: Contrastive Training for Context Scaling. arXiv: 2307.03170 [cs.CL].
Vaswani, Ashish et al. (2023). Attention Is All You Need. arXiv: 1706.03762.
VLLM (2024). Performance and Tuning. URL: https://docs.vllm.ai/en/latest/models/performance.html#chunked-prefill.
Wei, Jason et al. (2023a). Chain-of-Thought Prompting Elicits Reasoning in Large Language Models. arXiv: 2201.11903 [cs.CL]. URL: https://arxiv.org/abs/2201.11903.
Wu, Yuhuai et al. (2021). INT: An Inequality Benchmark for Evaluating Generalization in Theorem Proving. arXiv: 2007 . 02924 [cs.AI].
Yang, An et al. (2024). Qwen2 Technical Report. arXiv: 2407.10671 [cs.CL]. URL: https://arxiv.org/abs/2407.10671.
Yang, Zhilin et al. (2018). HotpotQA: A Dataset for Diverse, Explainable Multi-hop Question Answering. arXiv: 1809 . 09600 [cs.CL]. URL: https:// arxiv.org/abs/1809.09600.
Yao, Shunyu et al. (2023). Tree of Thoughts: Deliberate Problem Solving with Large Language Models. arXiv: 2305.10601 [cs.CL]. URL: https://arxiv.org/abs/2305.10601.

* cited by examiner

200

205

| | K0 | K1 | K2 | K3 |
| --- | --- | --- | --- | --- |
| Q0 | 1 | 0 | 0 | 0 |
| Q1 | 1 | 1 | 0 | 0 |
| Q2 | 1 | 1 | 1 | 0 |
| Q3 | 1 | 1 | 1 | 1 |

210

| | K0 | K1 | K2 | K3 | K4 | K5 | K6 | K7 |
| --- | --- | --- | --- | --- | --- | --- | --- | --- |
| Q4 | 1 | 1 | 1 | 1 | 1 | 0 | 0 | 0 |
| Q5 | 1 | 1 | 1 | 1 | 1 | 1 | 0 | 0 |
| Q6 | 1 | 1 | 1 | 1 | 1 | 1 | 1 | 0 |
| Q7 | 1 | 1 | 1 | 1 | 1 | 1 | 1 | 1 |

FIG. 2

400

| | Hello | my | name | is | John | This | is | a | dog |
|---|---|---|---|---|---|---|---|---|---|
| Hello | 1 | 0 | 0 | 0 | 0 | 0 | 0 | 0 | 0 |
| my | 1 | 1 | 0 | 0 | 0 | 0 | 0 | 0 | 0 |
| name | 1 | 1 | 1 | 0 | 0 | 0 | 0 | 0 | 0 |
| is | 1 | 1 | 1 | 1 | 0 | 0 | 0 | 0 | 0 |
| John | 1 | 1 | 1 | 1 | 1 | 0 | 0 | 0 | 0 |
| This | 0 | 0 | 0 | 0 | 0 | 1 | 0 | 0 | 0 |
| is | 0 | 0 | 0 | 0 | 0 | 1 | 1 | 0 | 0 |
| a | 0 | 0 | 0 | 0 | 0 | 1 | 1 | 1 | 0 |
| dog | 0 | 0 | 0 | 0 | 0 | 1 | 1 | 1 | 1 |

FIG. 4

500

| | | $\sigma_1$ | | | | $I_A$ | | PAD | | |
|---|---|---|---|---|---|---|---|---|---|---|
| | | K1 | K2 | K3 | K4 | K5 | K6 | P | P | ... |
| $\sigma_1$ | Q1 | 1 | 0 | 0 | 0 | 0 | 0 | 0 | 0 | 0 |
| | Q2 | 1 | 1 | 0 | 0 | 0 | 0 | 0 | 0 | 0 |
| | Q3 | 1 | 1 | 1 | 0 | 0 | 0 | 0 | 0 | 0 |
| | Q4 | 1 | 1 | 1 | 1 | 0 | 0 | 0 | 0 | 0 |
| $I_A$ | Q5 | 1 | 1 | 1 | 1 | 1 | 0 | 0 | 0 | 0 |
| | Q6 | 1 | 1 | 1 | 1 | 1 | 1 | 0 | 0 | 0 |

FIG. 5

700

| | | $\sigma_1$ | | | | $\sigma_2$ | | | | $l_A$ | | PAD | | $l(M_0)$ | | | PAD | | |
|---|---|---|---|---|---|---|---|---|---|---|---|---|---|---|---|---|---|---|---|
| | | K1 | K2 | K3 | K4 | K5 | K6 | K7 | K8 | K9 | K10 | P | ... | K21 | K22 | K23 | P | P | ... |
| $\sigma_2$ | Q5 | 1 | 1 | 1 | 1 | 1 | 0 | 0 | 0 | 0 | 0 | 0 | 0 | 0 | 0 | 0 | 0 | 0 | 0 |
| | Q6 | 1 | 1 | 1 | 1 | 1 | 1 | 0 | 0 | 0 | 0 | 0 | 0 | 0 | 0 | 0 | 0 | 0 | 0 |
| | Q7 | 1 | 1 | 1 | 1 | 1 | 1 | 1 | 0 | 0 | 0 | 0 | 0 | 0 | 0 | 0 | 0 | 0 | 0 |
| | Q8 | 1 | 1 | 1 | 1 | 1 | 1 | 1 | 1 | 0 | 0 | 0 | 0 | 0 | 0 | 0 | 0 | 0 | 0 |
| $l_A$ | Q9 | 1 | 1 | 1 | 1 | 1 | 1 | 1 | 1 | 1 | 0 | 0 | 0 | 0 | 0 | 0 | 0 | 0 | 0 |
| | Q10 | 1 | 1 | 1 | 1 | 1 | 1 | 1 | 1 | 1 | 1 | 0 | 0 | 0 | 0 | 0 | 0 | 0 | 0 |
| $l(M_0)$ | Q21 | 0 | 0 | 0 | 0 | 0 | 0 | 0 | 0 | 0 | 0 | 0 | 0 | 1 | 0 | 0 | 0 | 0 | 0 |
| | Q22 | 0 | 0 | 0 | 0 | 0 | 0 | 0 | 0 | 0 | 0 | 0 | 0 | 1 | 1 | 0 | 0 | 0 | 0 |
| | Q23 | 0 | 0 | 0 | 0 | 0 | 0 | 0 | 0 | 0 | 0 | 0 | 0 | 1 | 1 | 1 | 0 | 0 | 0 |

FIG. 7

800

| | | $\sigma_1$ | | | | $\sigma_2$ | | | | $l_a$ | | $M_1$ | PAD | $l(M_0)$ | | | $\omega(l(M_0))$ | PAD | |
|---|---|---|---|---|---|---|---|---|---|---|---|---|---|---|---|---|---|---|---|
| | | K1 | K2 | K3 | K4 | K5 | K6 | K7 | K8 | K9 | K10 | K11 | ... | K21 | K22 | K23 | K24 | P | ... |
| $M_1$ | Q11 | 1 | 1 | 1 | 1 | 1 | 1 | 1 | 1 | 1 | 1 | 1 | 0 | 0 | 0 | 0 | 0 | 0 | 0 |
| $\omega(l(M_0))$ | Q24 | 0 | 0 | 0 | 0 | 0 | 0 | 0 | 0 | 0 | 0 | 0 | 0 | 1 | 1 | 1 | 1 | 0 | 0 |

FIG. 8

BETTER INFERENCE PATTERN FOR LONG CONTEXT RETRIEVAL

CROSS-REFERENCE TO RELATED APPLICATIONS

This application claims the priority to and the benefit of U.S. Provisional Application No. 63/684,291, filed on Aug. 16, 2024, entitled "Better Inference Pattern for Large Context Retrieval", which is hereby incorporated by reference in its entirety for all purposes.

BACKGROUND

Large language models (LLMs) are artificial intelligence (AI) models trained on vast corpora of textual data to understand and generate human-like language. These models are employed in a wide range of applications, including text generation, summarization, translation, programming assistance, question answering, and conversational systems across various domains such as healthcare, education, and customer service. LLMs typically process input in the form of tokens, which are derived from raw text using a tokenizer. Tokens may comprise of words, sub-words, or characters. Each token is then mapped to a dense embedding—a numerical representation in a continuous vector space—that encodes semantic and syntactic information in a format interpretable by the model. In transformer-based architectures, including decoder-only LLMs, these token embeddings are typically of fixed dimensionality (e.g., 512, 1024, or 2048 dimensions etc.) and serve as the foundational input to subsequent layers of the model.

Despite LLMs wide applicability, LLMs exhibit limitations when dealing with long sequences of input data. This challenge primarily arises due to the fixed-length context window and the self-attention mechanism used in transformer-based architectures, which restricts the model's ability to capture long-range dependencies effectively. As a result, LLMs struggle with tasks involving long contexts, particularly when the relevant information is embedded in larger volumes of text. While transformers have outperformed earlier sequence modeling techniques due to their ability to apply self-attention over entire sequences, the quadratic computational complexity of attention mechanisms with respect to input length continues to hinder scalability.

Accordingly, there exists a need for methods, techniques, and/or systems that can enhance the capabilities of LLMs to process extended input sequences (or long context) accurately and efficiently, without requiring exponential increases in computational resources. Such improvements may facilitate broader deployment of LLMs in real-time and resource-constrained environments, enabling accurate handling of large-scale textual data across diverse tasks and domains.

SUMMARY

Some embodiments of the present disclosure relate to improving performance and user experience of large language models on long context inputs. A computer-implemented method includes accessing a prompt. The prompt may include a context (or long context) and an instruction. The instruction may correspond to a query associated with a natural language processing (NLP) task. The NLP task may correspond to one or more of multi-hop reasoning, retrieval-based answering, aggregation, and the like.

Further, the context may be divided into a plurality of segments. Each segment may correspond to a portion of the context. Each segment of the plurality of segments may be processed sequentially using a language model that includes a key-value cache (or KV-cache). The KV-cache can be used to maintain a causal flow of processed tokens. The processing of each segment of the plurality of segments sequentially may correspond to chunked prefill of the KV-cache.

According to disclosed embodiments, a segment-wise processing of the plurality of segments and a final prompt may occur in a single instance of the language model without resetting or reinitializing the KV-cache. The KV-cache may be updated incrementally based on the segment-wise processing of the plurality of segments. The KV-cache can be reused during generation of a final output based on the final prompt.

In some embodiments, the language model can be a transformer-based LLM supporting long-context inference. The transformer-based LLM may include off-the-shelf models. The off-the-shelf models may include but are not limited to Phi, Qwen, Llama.

During chunked prefill the KV-cache, an auxiliary output, for each segment of the plurality of segments, may be generated from the language model based on the instruction and the segment. The auxiliary output may be comprised of a margin note that may represent intermediate extractive summary or relevance assessment. The auxiliary output may further comprise a classification label of the margin note. In some instances, the classification label may correspond to a 'Yes' token or a 'No' token and that is generated based on a relevance of the margin note with the instruction. In some other instances, the classification label may include a binary value. Moreover, in some instances, the margin note and the classification label may be generated using a same instance of the language model (or the transformer-based LLM).

The disclosed technique may further include determining that the margin note is relevant to the instruction based on a margin selection policy. The margin selection policy may include selecting the margin note if a relevance score of the margin note exceeds a predefined threshold. Moreover, the relevance score may be assigned to the margin note by using a classifier. In some instances, the same instance of the language model that generates the margin note may be utilized (as the classifier) to assign the relevance score to the margin note. Furthermore, the margin selection policy may also select the margin note based on the classification label in the auxiliary output.

Based on the determination that the margin note is relevant to the instruction, the margin note may be assigned to selected margins. The selected margins may be retained for final inference based on the final prompt. The selected margins may comprise one or more intermediate extractive summaries (or margin notes) of the long context that may guide the language model in generating the final output, without modifying internal weights of the language model.

After segment-wise processing of each segment of the plurality of segments, the final prompt may be generated by at least prepending the selected margins to the instruction. In some instances, for generation of the final prompt, the selected margins and the instruction may be appended to a final segment of the context. In some other instances, only the selected margins may be prepended to the instruction.

Afterwards, the final prompt may be executed by using the language model to generate the final output corresponding to the NLP task associated with the instruction. The final output may be provided to a user via a user interface running on a computing device.

According to some aspects of the present disclosure, the user interface may be populated in real-time or substantially real-time with one or more margin notes and/or a progress indicator of the NLP task. During segment-wise processing of the context, the generated margin notes can be streamed on the user interface. One or more user interactions may be received through the user interface. The one or more user interactions may include an approval or a disapproval of the one or more margin notes. In some embodiments, the margin selection policy may further include selecting the margin note corresponding to an approval from the user.

In some embodiments, a system is provided that includes one or more data processors and a non-transitory computer-readable storage medium containing instructions which, when executed on the one or more data processors, cause the one or more data processors to perform part or all of one or more methods disclosed herein.

In some embodiments, a computer-program product is provided that is tangibly embodied in a non-transitory machine-readable storage medium and that includes instructions configured to cause one or more data processors to perform part or all of one or more methods disclosed herein.

In some embodiments, a system is provided that includes one or more means to perform part or all of one or more methods or processes disclosed herein.

The terms and expressions which have been employed are used as terms of description and not of limitation, and there is no intention in the use of such terms and expressions of excluding any equivalents of the features shown and described or portions thereof, but it is recognized that various modifications are possible within the scope of the invention claimed. Thus, it should be understood that although the present invention as claimed has been specifically disclosed by embodiments and optional features, modification and variation of the concepts herein disclosed may be resorted to by those skilled in the art, and that such modifications and variations are considered to be within the scope of this invention as defined by the appended claims.

BRIEF DESCRIPTION OF THE DRAWINGS

The present disclosure is described in conjunction with the appended figures.

FIG. 2 illustrates a configuration of an attention mask for chunked prefill, where each chunk retains causal masking internally and attends fully to previous chunks.

FIG. 4 illustrates an example configuration of an attention mask to pack two unrelated sequences without cross-attention in accordance with some embodiments of the present disclosure.

FIG. 5 illustrates initialization or prefilling of a KV-cache with a first segment of a long context and an extractive instruction, while also incorporating padding tokens in accordance with some embodiments of the present disclosure.

FIG. 7 illustrates an attention mask of chunked prefill the KV-cache with a second segment along with the extractive instruction and a classification prompt for a previously generated margin.

FIG. 8 shows a parallel generation of tokens for both the margin and the classification result in accordance with some embodiments of the present disclosure.

DETAILED DESCRIPTION

Figure 1:
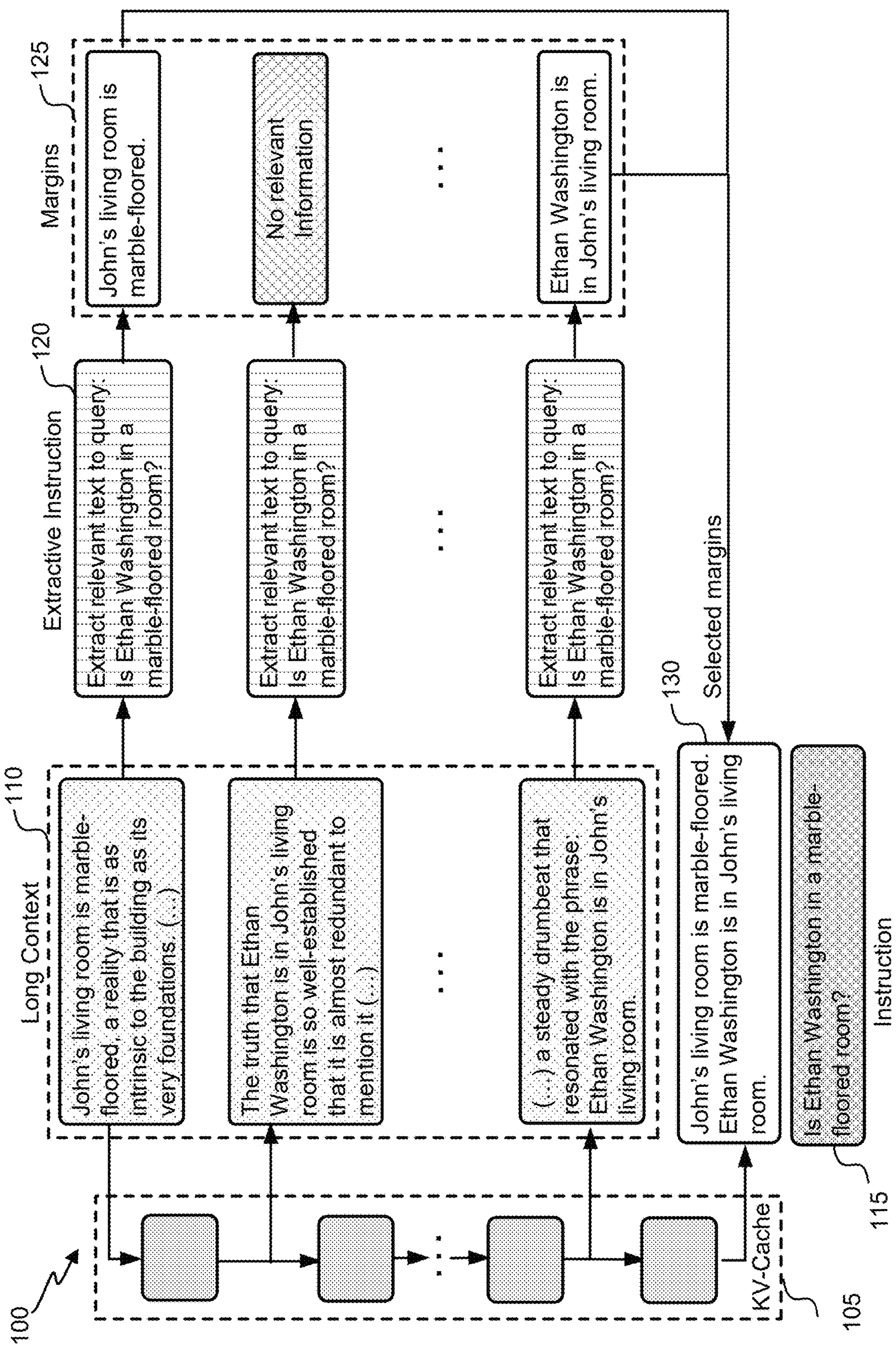
FIG. 1 is an example block diagram illustrating an inference pattern referred to as writing in the margins (WiM) in accordance with some embodiments of the present disclosure.

The present disclosure discloses embodiments relating to an inference pattern for large language models (LLMs) that can improve the processing of long input sequences, particularly in retrieval-oriented tasks. More specifically, the disclosed techniques may leverage the chunked prefill of the KV-cache to perform segment-wise inference (or segment-wise processing). The disclosed segment-wise inference or reasoning mechanism may enable efficient processing of extensive contexts along with generation and classification of intermediate information (or auxiliary outputs) also referred herein as 'margins'. These margins may act as task-guiding elements that can improve long-context comprehension of the LLMs and may enable the model to localize relevant information within the long input sequences (or long context). According to some embodiments, a technical solution is provided in the present disclosure to a technical problem of efficient processing of long context by language models to improve response accuracy and user experience while maintaining low computational cost.

Some other techniques to improve the performance of LLMs on long or complex input sequences may include external memory augmentation, retrieval-based techniques, context aggregation, or scratch-pad mechanisms. One category involves the use of external memory augmentation and retrieval-based techniques, where models are supported by mechanisms such as k-nearest neighbor (k-NN) memory banks or retrieval-augmented generation (RAG). These systems allow LLMs to reference external knowledge sources—including structured knowledge graphs and entity embeddings—to retrieve relevant information dynamically, thereby enhancing factual accuracy and contextual alignment. A primary drawback is the increased inference cost, which scales quadratically with the number of tokens and, consequently, with the number of retrieved documents when using transformer-based architectures.

A second class of techniques may focus on context aggregation, where multiple input segments or sources are fused to improve coherence and relevance. For instance, Fusion-in-Decoder (FiD) architectures, commonly employed in encoder-decoder models like T5 and BART, perform aggregation at both encoder and decoder levels. Other strategies, such as LangChain's MapReduce pipeline or the use of Parallel Context Windows (PCW) and Naive Bayes Context Extension (NBCE), divide lengthy input into manageable sub-units for parallel processing, which can improve latency and response quality.

A third class of methods leverages scratchpad-style intermediate reasoning, also known as Chain-of-Thought (CoT) prompting. These techniques guide LLMs to explicitly output intermediate computations or reasoning steps prior to final predictions, thereby improving performance on multi-hop or multi-step tasks such as math reasoning (or theorem proving) or extensive text synthesis. By training models to sequentially output the results of intermediate steps rather than only final answers, scratchpad-based method may help the model to maintain and extend context dynamically and also aid in debugging and/or understanding the model decisions to enhance both interpretability and robustness.

In contrast, the techniques disclosed in the present disclosure may improve long-context inference by incrementally extracting and utilizing segment-specific auxiliary outputs (i.e., margin notes) directly within the model's native inference flow. Unlike retrieval-based, aggregation, or scratchpad approaches, the disclosed design does not depend on external memory and does not need to explicitly output intermediate reasoning steps. Moreover, the disclosed technique may maintain causal attention across segments of long context by using a statically allocated KV-cache. Further, margin generation and selection as disclosed herein may serve as a lightweight yet effective mechanism to enhance final predictions—all without modifying internal model weights or relying on additional modules. Furthermore, the disclosed techniques can be used with the off-the-shelf models and do not demand fine-tuning or architectural changes in the LLMs.

According to aspects of the present disclosure, the disclosed inference pattern may apply a technique referred to as chunked prefill, wherein long prompts are partitioned into fixed-size segments for staged population of the KV-cache at each transformer layer. The key-value cache (KV-cache) may store key (K) and value (V) vectors computed at each layer of a transformer for tokens that have already been processed. During inference, the cache may enable the model to reuse previously computed key and value (K, V) vectors, thereby avoiding redundant computations and facilitating efficient processing of long input sequences.

In the present disclosure, the disclosed inference pattern is also referred herein as 'Writing in the Margins or (WiM)'. During segment-wise prefill or chucked prefill of the KV-cache, the WiM technique concurrently generates query-focused extractive summaries at each step of the prefill and the extractive summaries can be subsequently reintegrated at the end for the final prompt (or original instruction) execution. These intermediate outputs or auxiliary output (i.e., extractive summaries) are also referred herein as 'margins'. These margins are subsequently reincorporated into the prompt at later stages of inference to facilitate more informed downstream token prediction. While inspired by scratchpad techniques, the WiM pattern may operate at the interface of context ingestion and intermediate reasoning, binding margin generation directly to the chunked KV-cache population. Unlike traditional scratchpad methods that may rely on architectural or training modifications, the WiM may function at inference time and may maintain compatibility with off-the-shelf models.

In the present disclosure, the term query may refer to the original user-specified objective, such as a question or task the user seeks to answer using a language model. Moreover, an instruction may denote a structured or reformulated version of the query, crafted to guide the model in performing the task in a controlled and interpretable manner. The instruction may rephrase the query or embed it in a task-specific template. Further, a prompt may encompass the full input sequence provided to the language model and typically follows a structured format, such as system message+context+instruction, where "+" denotes string concatenation. The context may be comprised of the relevant textual material (e.g., documents or segments), while the system message can optionally be used to specify behavior or role (e.g., "You are a legal assistant"). The prompt is ultimately what the model receives and processes for inference.

According to some embodiments, the context or long context utilized in the disclosed system may be obtained through either user input or automated retrieval by the system. In some instances, the user may directly provide the full-length document, transcript, or multi-part text (e.g., legal documents or research articles), which can be subsequently segmented and processed by the system. In other instances, the system may automatically retrieve relevant segments or documents from a larger corpus or external knowledge base using a retrieval model or search interface. These retrieved or supplied segments form the basis for margin generation and final prediction. Moreover, the disclosed system can be designed to accommodate both user-provided and system-retrieved contexts and may achieve flexible deployment across retrieval-augmented and user-driven scenarios.

According to some aspects of the present disclosure, the margins may be classified based on their relevance with the instruction. In some instances, a single instance of the model may be employed for both margin generation and classification without any modification to the prefilled KV-cache. In some other instances, margin generation and classification may be decoupled via separate classification prompts, executed within the same model instance.

In some instances, a classifier (e.g., the LLM) may generate a binary classification label (e.g., 1 or 0). The binary classification label may involve the generation of a 'Yes' or 'No' token based on the relevance of a particular margin (or margin note) with respect to the instruction. In some cases, the classification label may first be generated based on the relevance of a particular segment to the instruction. If the classification label is positive or 'Yes', then a margin note may be generated by executing an extractive instruction, thereby reducing computational cost. The extractive instruction may be derived from the instruction (or the original instruction). In some other instances, the classifier may provide a relevancy score for each margin note.

Further, a margins selection policy may be employed to select relevant margins for the final prompt inference. The margin selection may select margins based on the classification label, relevancy score, or user feedback. The margin selection policy may select margins with classification label 'Yes' (positive, or 1 etc.). Similarly, the margin selection policy may select margins having the relevancy score greater than a predefined threshold.

In some instances, selected margins may be prepended to the instruction to generate the final prompt. In some other instances, selected margins and the context (e.g., the final segment) may be prepended to the instruction to generate the final prompt. In yet some instances, all the margins may be prepended to the instruction to generate the final prompt of the task.

According to some aspects of the present disclosure, the WiM design or inference pattern may also provide end-users with real-time insights into computational progress via streamed margin notes on a user interface running on a computing device (e.g., a user device). This approach may facilitate users pinpointing the location of relevant information and reducing the computational load by early exits if the provided information (e.g., streamed margin notes) may satisfactorily address the query. In some instances, inference can be paused after each segment processing or generation of a margin note. Moreover, the user can provide feedback via the user interface, for example, approval or disapproval on the streamed margin notes. Furthermore, the margin selection policy may incorporate the user feedback on the margin notes to select or reject a particular margin note for the final inference.

In example implementations, the WiM technique is demonstrated using seven commercially available long-context models supporting up to 128k-token inputs. In the example implementations, variants of Phi, Qwen, and Llama models are considered as the long context models, which are all decoder-only LLMs based on the transformer architecture. Each of these models may process input tokens using fixed-dimensional token embeddings, which serve as the input to the model's layers. For example, Phi models by Microsoft® may use embeddings with a hidden size such as 2048, while Qwen models by Alibaba® and Llama models by Meta® may employ fixed hidden sizes—4096 for Qwen-7B and up to 8192 for Llama-65B—depending on the model scale. Despite differences in design goals and training data, these models all rely on dense token embeddings of consistent dimensionality, demonstrating a common structural foundation across modern decoder-only LLMs. Moreover, the WiM inference pattern is evaluated on three types of tasks such as Multi-hop Reasoning, Needle-in-a-Haystack Retrieval, and Aggregation, under extended context conditions.

It may be appreciated that the techniques disclosed in the present disclosure such as the Writing in the Margins (WiM) inference pattern can effectively improve the performance of off-the-shelf models across long-context retrieval tasks while incurring only marginal additional computational cost. Additionally, the disclosed inference pattern can be fit into an interactive retrieval design that may provide end-users with ongoing updates about the progress of context processing and pinpoints the integration of relevant information into the final response. Furthermore, the technique supports human-in-the-loop scenarios, wherein users may annotate margins or margin notes to influence the model's final decision-making, thereby aligning model behavior with user intent in a verifiable and auditable manner. The disclosed system bridges the gap between architectural advances in efficient transformer models and the development of structured prompting strategies, facilitating their combined application to long-context reasoning tasks with improved comprehension and inference accuracy.

FIG. 1 is an example block diagram illustrating an inference pattern 100 referred to as writing in the margins (WiM) in accordance with some embodiments of the present disclosure. The WiM may augment long-context comprehension by incorporating intermediate extractive summaries (or margins) into the inference pipeline. WiM technique is built upon a commonly used mechanism, named chunked prefill, wherein segments of a long input sequence (or a long context 110) are sequentially cached into a key-value (KV) memory or a KV-cache 105.

The long context 110 can be divided into multiple segments. Each segment of the long context 110 may be processed independently during prefilling the KV-cache 105 segment by segment. The margins 125 or intermediate extractive summaries can be generated that can improve the final prediction of the model for an instruction 115 (or an original instruction). For instance, the first segment may include the statement: "John's living room is marble-floored, a reality that is as intrinsic to the building as its very foundations". This segment may then be passed along with an extractive instruction 120 such as: "Extract relevant text to query: Is Ethan Washington in a marble-floored room?" Based on the extractive instruction 120, the model (or LLM) may generate a corresponding margin, which in this example yields the output: "John's living room is marble-floored".

Similarly, in the next or second segment of the long context 110, the statement: "The truth that Ethan Washington is in John's living room is so well-established that it is almost redundant to mention it," may be encountered. The (same) extractive instruction 120 may be applied on the second segment. The second segment does not provide directly relevant information in relation to the query or the instruction 115. As a result, the generated intermediate summary in the margins 125 for this segment can be "No relevant information".

Further, a subsequent segment in the long context 110 may include the text: " . . . a steady drumbeat that resonated with the phrase: Ethan Washington is in John's living room." Again, the extractive instruction 120 may be applied. This results in a margin that may have the following text: "Ethan Washington is in John's living room".

After all segments of the long context 110 are processed in this manner, the margins 125 can be concatenated into selected margins 130. In some instances, the selected margins 130 may include only relevant margins with the instruction 115 (or the original query). In some other instances, the selected margins 130 may comprise all the margins 125 including both relevant and irrelevant margins. In the example illustration in FIG. 1, two relevant margins (or informative margins) are retained: "John's living room is marble-floored" and "Ethan Washington is in John's living room" in the selected margins 130. The selected margins 130 may then be appended to a final segment for the generation of a response of the instruction 115.

Afterwards, the instruction 115 such as "Is Ethan Washington in a marble-floored room?" can be executed. By conditioning the model on the selected margins 130 alongside the final prompt, the inference process may benefit from localized, query-relevant summaries that can enhance long-range dependency resolution and reasoning efficiency. Hence, the model may reason over both the long context 110 and the generated intermediate summaries or the margins 125 that are providing insights relevant to the instruction 115. The inference pattern 100 or WiM approach may leverage the extraction of partial knowledge during prefill while maintaining compatibility with transformer-based inference mechanisms.

In accordance with some embodiments, the margin generation process may operate without modifying the original segments and can avoid dependence on ground-truth annotations, making it suitable for both zero-shot and few-shot inference scenarios. The margins 125 may function analogously to margin notes in human reading, reinforcing comprehension and guiding the final answer formulation.

FIG. 2 illustrates a configuration of the attention mask for chunked prefill, where each chunk retains causal masking internally and attends fully to previous chunks. Chunked prefill can reduce memory overhead and is mathematically equivalent to prefill without chunking. The chunked prefill procedure can be used to populate the KV-cache 105 in transformer-based models.

Two attention mask matrices or tables are shown in FIG. 2, i.e., a top table 205 for a first chunk and a bottom table 210 for a second chunk. Each table may provide a visual representation of the attention mask, which is a binary matrix showing which query (Q) tokens can attend to which key (K) tokens. In the transformer attention mechanism, Q (query) may represent the current token trying to gather information and K (key) may represent each token in the context that the query may attend to.

In the top table 205 and the bottom table 210, rows representing query positions (e.g., Q0-Q3 for the first chunk and Q4-Q7 for the second chunk) and columns representing key positions (K0-K3 for the first chunk and K0-K7 for the second chunk). Matrix entries may indicate the visibility of key tokens to query tokens, where a value of '1' denotes allowed attention and '0' indicates masked positions. For instance, in the top table 205, Q1 can attend to K0 and K1, whereas, Q3 can attend to K0-K3. The top table 205 forms a triangular matrix representing a causal mask, where each token can only look at previous tokens.

During inference, chunked prefill may divide the prompt into fixed-size chunks to populate the KV-cache 105 at each layer of the transformer model. The rationale for chunked prefill is to reduce overall memory usage, as the quadratic memory complexity of the attention mechanism during prefilling can be prohibitive for larger prompts. For a prompt of length N divided into M chunks of size K (where M=N/K), memory complexity can be reduced from $O(N^2)$ to O(NK).

To preserve autoregressive causality, each new chunk is configured to attend to all tokens from prior chunks (i.e., all preceding key positions are unmasked), while maintaining a causal attention mask within the current chunk. For example, as illustrated in FIG. 2, the first chunk may have K0-K3 tokens, and the second chunk may have K4-K7 tokens. As shown in the bottom table 210 for the second chunk, Q4-Q7 (new queries) can attend to all K0-K3 from the first chunk (cross-chunk memory reuse) and can also attend causally to K4-K7 (their own chunk). Thus, causal flow is preserved within a chunk, and full attention is enabled to all prior chunks. This approach ensures equivalence to prefill without chunking while improving memory efficiency.

Causal flow in the KV-cache 105 may refer to maintaining the temporal ordering of tokens during autoregressive generation in transformer models. Thus, each token can only attend to previous tokens and not future ones, thereby respecting the causality of language. The attention mask may enforce this constraint, i.e., blocks any attention to future tokens. In chunked processing, causal flow may need to be preserved. Even though context is processed in parts (chunks), each chunk's tokens can only see the tokens that came before it in the overall sequence (or the long context 110), not after.

Figure 3:
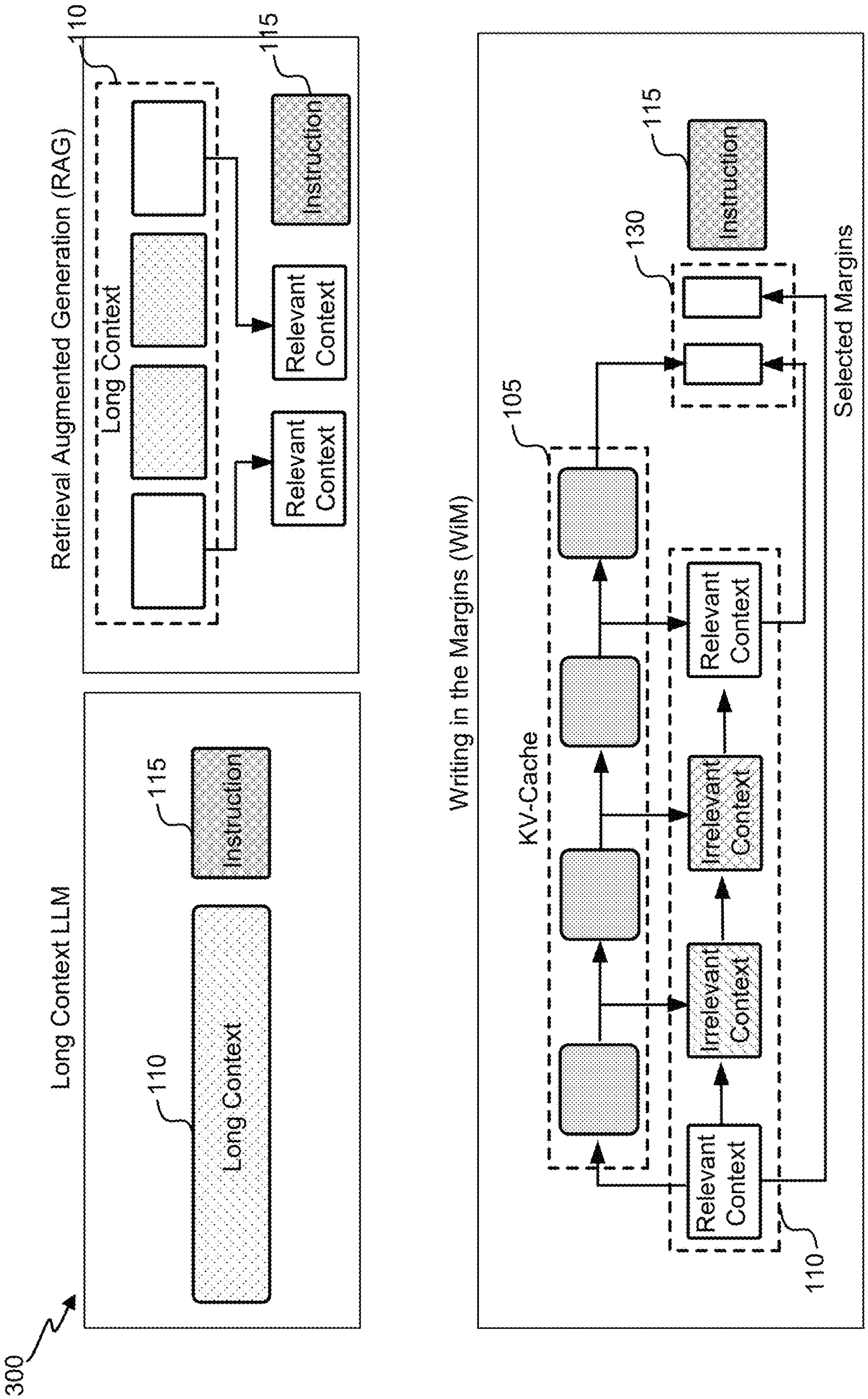
FIG. 3 illustrates design comparisons among long context LLM, RAG, and the WiM, highlighting differences in segmentation, retrieval, and margin integration during long-context inference.

FIG. 3 illustrates design comparisons among long context LLM, RAG, and the disclosed WiM approach, highlighting differences in segmentation, retrieval, and margin integration during long-context inference. A comparative overview of three distinct inference designs for handling long-context prompts: long context LLM, retrieval-augmented generation (RAG), and the disclosed writing in the margins (WiM) approach is provided in FIG. 3. Each method may differ in its mechanism for processing extended inputs and structuring the prompt for final inference.

In the long context LLM design (top left), the entire long context may be provided to the model in a monolithic fashion, without segmentation. Moreover, no selective filtering or intermediate summarization may be performed. This approach relies on the model's native capability to process long input sequences directly. The instruction 115 (or task instruction) may be appended at the end of the input (or the long context 110). The model may process the entire sequence in a single pass, relying on native attention mechanisms to retrieve relevant content internally.

In the RAG design (top right), the long context 110 may be initially segmented into multiple parts. A retrieval mechanism, for example, cosine similarity between vector embeddings of the query and each segment, can be used to identify relevant segments. The selected segments or the relevant segments may then be concatenated with the instruction 115 to form the final prompt. The RAG approach may enable focused input construction but is sensitive to retrieval quality.

The WiM design (bottom) may introduce a segmented and incremental inference strategy. The long context 110 may be divided into multiple segments and each segment can be processed sequentially through the KV-cache 105 of the transformer model (or LLM). At each step, the model can be instructed to generate auxiliary information (i.e., margin notes or intermediate extractive summaries) from the current segment based on the segment's relevance to the instruction 115. These margin notes may be subsequently evaluated and, if deemed useful, are retained as the selected margins 130. The selected margins 130 are then prepended to the (task) instruction 115 to guide the model during the final inference step. The WiM design can maintain full causal flow through the KV-cache 105 while incorporating a lightweight, segment-specific auxiliary signals (extractive reasoning layer) that complement the final prediction.

According to some embodiments of the present disclosure, the prompt can be structured in the following format based on the popular subset of generative NLP tasks, Prompt: system message+context+instruction. Here, + denotes string concatenation. For clarity, the system message will be excluded in subsequent descriptions, as it can be prepended to the context if needed. The context may then be divided into a series of N segments, $\sigma_i$ of length L with instruction I:

$$\sigma_1 + \sigma_2 + \sigma_3 + \ldots + \sigma_N + I \qquad \text{Equation 1}$$

In some embodiments, a decoder-only transformer model T may be considered and context σ may be divided into two segments, $\sigma_1$ and $\sigma_2$. Let's denote the prediction of T on $\sigma_1$ as $T(\sigma_1)$. The $T(\sigma_1)$ prediction may include past key values $pkv_1$. Using $pkv_1$ for predicting the subsequent segment with $T(pkv_1, \sigma_2)$ yields identical results to executing the model on the original context T(σ). The term 'past key values,' as used herein, may refer to indicate the state of the KV-cache 105 at a specific point of the prefill phase.

By performing chunked prefill, the intermediate state after $T(\sigma_1)$ can be accessed. The intermediate state can be used to generate useful supplemental information, similar to writing margin summaries in a lengthy book. If the instruction 115 I is known beforehand, then extraction of summary may be feasible from each segment $\sigma_i$. If the extracted summary (or margin notes) is helpful, then the margin notes can be appended to the context. Thus, relevant information to the instruction 115 I may be repeated to improve the model's understanding of the context for completion of a user's task. The disclosed WiM technique may rely on the 'Lost in the Middle' hypothesis, which suggests that model performance is optimal when important information is positioned at the beginning or end of the input. In some instances, the aggregated margin content or the selected margins 130 may thus be placed at the end of the original context. In other instances, the selected margins 130 may be place at the start of the original context.

According to some aspects of the present disclosure, the segmentation logic as discussed before can be used to divide the context into segments $\sigma_i$. Moreover, the mapping given by a transformer T after prediction on the segment $\sigma_i$ can be defined as $T(pkv_i)=T^i(\bullet)$. Here $T^0$ may represent the model T at the initial state. In the chunked prefill inference, the final prediction P from the context $\Sigma_i\sigma_i$ with the instruction 115 I may be computed through the following N steps:

$$\begin{gathered} T^0(\sigma_1) \\ T^1(\sigma_2) \\ \vdots \\ T^{N-1}(\sigma_n) \\ T^N_{GEN}(I) = P \end{gathered} \quad \text{Equation 2}$$

The last step $T^N(I)$ may be used to autoregressively generate the final answer. The operation of invoking generate( ) of model $T^i(I)$ can be denoted as $$T^i_{GEN}(I).$$

In the present disclosure, the design of chunked prefill inference is further modified by adding extra generate steps that may run concurrently with the original steps (as shown in Equation 2). During each of these extra generate steps, the model may be prompted to produce an auxiliary answer $M_i$ (also referred herein as a 'margin note') by appending an extractive instruction 120 $I_A$ (also referred herein as a 'margin prompt').

$$\begin{gathered} T^0(\sigma_1) \\ T^0_{GEN}(I_A) = M_0 \\ T^1(\sigma_2) \\ T^1_{GEN}(I_A) = M_1 \\ \vdots \\ T^{N-1}(\sigma_n) \\ T^{N-1}_{GEN}(I_A) = M_{N-1} \end{gathered} \quad \text{Equation 3}$$

The margin notes or outputs $M_i$ of each step can be collected and may be stored as plain text. In order to reduce noise, all the margins 125 $M_i$ may then be filtered by relevance to the instruction 115 I using a Boolean classifier $\omega_1$.

$$A = \sum_k \{M_k \mid \omega_I(M_k) = 1\} \quad \text{Equation 4}$$

The final inference of the model $T^{N-1}$ can be executed on the context comprised of a last segment of the context, auxiliary information A (or the selected margins 130) and the (task) instruction 115 I.

$$T^{N-1}_G(\sigma_N + A + I) \quad \text{Equation 5}$$

Hence, the model may utilize the relevant intermediate predictions (auxiliary information A) while answering the final query. Moreover, the pseudocode of the disclosed WiM algorithm is presented in TABLE 1.

In some embodiments, the same instance of the model can be used for both generating the margins 125 and classifying them, without affecting the prefilled KV-cache. For instance, after generating the margins 125, it is possible to infer the model with a classification prompt without using the KV-cache 105 (past_key_value) generated during the prefilling operation (see, line 8 of the pseudocode in TABLE 1). In this way, the model may act as if it had never been prefilled. Having classified the margins 125, it is possible to reuse the previously prefilled KV-cache to append the classified margins and then generate the final output. The overhead of classifying a single margin, in terms of memory, is just the KV-cache size of a single margin and the classification prompt, which is negligible as compared to the prefilled long-context prompt. In some instances, it is also possible to overlap the generation of margins with their classification using the same model instance and the same request in the batch.

TABLE 1

Pseudocode for writing in the margins (WiM) algorithm.
Algorithm 1: Writing in the Margins

```
Input :system_message (string)
       context (string)
       instruction (string)
       extractive_summary_prompt (string)
       classification_prompt (string)
       llm (object)
Output: output (string)
1  context ← system_message + context;
2  segments ← split(context);
3  past_key_value ← [ ];
4  positive_margins ← [ ];
```

TABLE 1-continued

Pseudocode for writing in the margins (WiM) algorithm.
Algorithm 1: Writing in the Margins

```
for segment ∈ segments do
        // add the segment to the KV-Cache
        prefill(llm, past_key_value, segment);
        // generate using the content of the KV-Cache and then
        discard any tokens added to the KV-Cache by the prompt and
        the generated tokens
        margin ← generate(llm, past_key_value, extractive_summary_prompt);
             classification_input ← format(classification_prompt, margin, instruction);
        // do not use any past KV-Cache to classify
        classification_result ← generate(llm, NULL, classification_input)
        if classification_result = true then
                append(positive_margins, margin)
           end
   end
   all_positive_margins ← concatenate(positive_margins);
      prefill(llm, past_key_value, all_positive_margins);
   output ← generate(llm, past_key_value, instruction);
   return output
```

The disclosed WiM inference technique may generate supplemental or auxiliary information (the margins 125) by leveraging a partially prefilled KV-cache. Each subsequent segment σ in the KV-cache 105 can be used to generate a margin note. To avoid providing the model with all the margins 125, the model can be configured to generate a first token corresponding to the margin classes: relevant vs. irrelevant. In some instances, by decoupling the extraction and classification steps, separate prompting strategies can be used. This separation may further boost the performance of the WiM inference pattern. Moreover, the same instance of the model can be used to perform both the computation of the margins 125 and their classification.

In a naive implementation of such overlapped computation, a user may treat the classification request as an additional sequence and batch it with the prefilling request. This approach may need a large number of padding tokens to align the two sequences. A more computationally efficient solution may be to pack the classification request into the same sequence used to prefill the context and adjust the attention mask accordingly.

FIG. 4 illustrates an example configuration 400 of an attention mask to pack two unrelated sequences without cross-attention in accordance with some embodiments of the present disclosure. An attention mask configuration illustrating how unrelated sequences can be packed into a shared input sequence while preventing cross-attention is shown in FIG. 4. The example configuration 400 of the attention mask may enable efficient sequence packing during prefilling. Multiple unrelated document sequences can be combined into a single input sequence or stream by adjusting the attention mask to prevent unintended cross-attention between segments. Hence, each token may attend only within its respective sequence. For example, in the example configuration 400, the 'dog' token may attend causally to 'This', 'is', 'a', 'dog' tokens and will not attend to other unrelated tokens (e.g., 'Hello', 'my', 'name', 'is', 'john'). The illustrated attention mask may avoid excessive padding and reduce computational waste. The attention mask configuration is applicable in both training and inference scenarios. This speeds up training time by reducing the number of padding tokens. Moreover, by utilizing the attention mask configuration, multiple prompts can be processed concurrently without contamination, thereby accelerating model throughput.

FIG. 5 illustrates the prefilling or initialization of the KV-cache 105 with a first segment $\sigma_1$ of the long context 110 and the extractive instruction 120 $I_A$, while also incorporating padding tokens. The padding tokens are shown for clarity, typically used in statically allocated caches. During attention calculation, these padding tokens may be excluded, and only valid tokens from $\sigma_1$ and $I_A$ may be used. This configuration may support the generation of a margin note $M_0$. After generating the margin note $M_0$, the extractive instruction 120 $I_A$ and all the subsequent tokens generated in $M_0$ can be removed from the KV-cache 105, ensuring that only $\sigma_1$ remains for subsequent operations.

Figure 6:
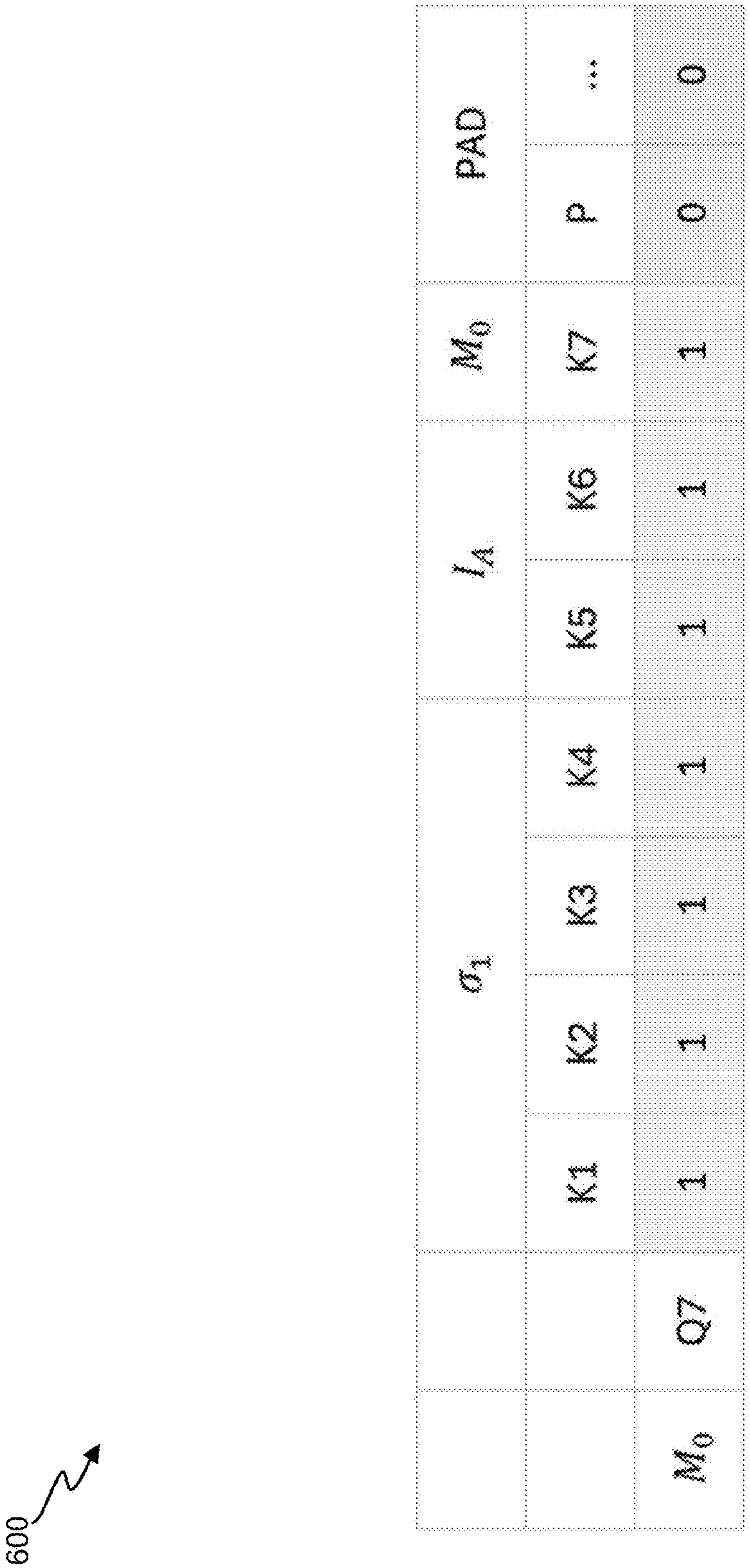
FIG. 6 illustrates a token generation process using the prefilled KV-cache in accordance with some embodiments of the present disclosure.

FIG. 6 illustrates the token generation process using the prefilled KV-cache in accordance with some embodiments of the present disclosure. Each new token produced by the model may replace a corresponding padding position in the KV-cache 105. For example, the generated tokens for the margin note $M_0$ can be written into the pre-allocated padding positions in the KV-cache 105. In order to avoid growing or shrinking a dynamically allocated KV-cache, it is possible to use a statically allocated KV-cache, since the total number of tokens in each segment, extractive instruction 120 $I_A$, and classification prompt is known in advance, so is the maximum number of tokens for each margin $M_i$ and classification result $\omega(I(M_i))$. The system may maintain a static layout for tokens from the context and the extractive instruction 120 $I_A$, which may enable seamless reuse of KV tensors without resizing or realignment.

FIG. 7 illustrates an attention mask of prefilling the KV-cache 105 with a second segment $\sigma_2$ along with the extractive instruction 120 $I_A$ and a classification prompt $I(M_0)$ for a previously generated margin $M_0$. In this case, the padding tokens between the extractive instruction 120 $I_A$ and the classification prompt $I(M_0)$ may need to be included in the KV sequence when calculating the attention to retain the memory continuity of the tensor, but the terminal padding tokens need not be. The attention mask is structured to ensure $\sigma_2$ can attend to all tokens in $\sigma_1$ while $I(M_0)$ may remain isolated as a separate subsequence.

After generating the first margin $M_0$, it is possible to add the second segment $\sigma_2$ to generate the second margin $M_1$ while at the same time classifying the previously generated margin $M_0$. To do so, the KV-cache 105 can be prefilled with subsequent tokens $\sigma_2$, the extractive instruction 120 $I_A$, and a number of padding tokens to accommodate the generated tokens of margin $M_1$. Moreover, the KV-cache 105 can also be expanded by adding the classification instruction $I(M_0)$ and a number of padding tokens to accommodate the generated tokens for the classification result $\omega(I(M_0))$.

FIG. 8 shows a parallel generation of tokens for both the margin $M_1$ and the classification result $\omega(I(M_0))$ in accordance with some embodiments of the present disclosure. Each generated token is inserted into pre-allocated padding slots within its respective subsequence. Autoregressive token generation of the margin $M_1$ and the classification result $\omega(I(M_0))$ can be done in parallel by projecting (using the decoder) the last token of each sub-sequence to compute logits independently. The concurrent progression of both tasks may reduce latency and simplify cache management while preserving sequence boundaries.

According to some embodiments, by using a statically allocated KV-cache and keeping track of the number of tokens utilized, it is possible to access a partial view (also known as "tensor slicing") of the KV tensor without incurring additional computational overhead. Techniques such as Paged Attention may also be employed to allocate the KV-cache 105 block by block, thereby optimizing memory usage while retaining the benefits of partial static allocation.

Examples

Example implementations of the disclosed techniques are provided to experimentally evaluate the writing in the margins (WiM) inference as described in FIG. 1 and FIG. 3. Seven publicly available long-context language models supporting up to 128k-token context lengths were selected for evaluation. These included Phi-3-small-128k-instruct, Qwen2-7B-Instruct, Meta-Llama-3.1-8B-Instruct, Phi-3-medium-128k-Instruct, Meta-Llama-3.1-70B-Instruct, Qwen2-72B-Instruct, and Palmyra-4-Chat-128K.

In all experiments, the models were utilized in half precision, using identical sampling parameters—specifically, a temperature setting of 0.0 with greedy decoding. Zero-shot prompts were employed for all benchmarks. For the MultiHop-RAG, HotPotQA, and SQUAD experiments, a consistent, model-agnostic preprocessing pipeline was applied: contexts were first split into sentences using a sentence tokenizer such as natural language tool kit (nltk) and then grouped into segments not exceeding 4096 tokens. For the common words extraction (CWE) benchmark, tokenization was performed by splitting words using space characters. Token counts were computed using the GPT-4 tiktoken tokenizer to ensure neutrality with respect to tokenizer differences across models.

The evaluation focused on measuring the relative change in performance of the disclosed WiM inference pattern compared to two baselines: The first baseline (Long Context LLM) involved feeding the entire unsegmented context directly into the language model. The second baseline (Retrieval-Augmented Generation, or RAG) used a retriever mechanism to select relevant segments, which were then concatenated with the instruction 115 and passed into the language model for inference. Retriever may utilize, for example, cosine similarity between vector representations of the instruction 115 and the segments to determine relevant segments.

In order to make results more comparable, the Retriever in RAG was replaced by the LLM classifier used in WiM inference. The RAG results are expected to be lower in the real RAG systems (especially for longer segment lengths) as vectorization is a form of lossy compression.

Three types of tasks relevant to long-context processing were used to measure the performance of WiM inference. The tasks include multi-hop reasoning, filter-type retrieval tasks (needle retrieval and single-hop question answering), and aggregation tasks.

Multi-hop reasoning category aims to assess the models' ability to resolve queries that require tracing entity relationships across multi-hop connections. Transformers are typically constrained in simulating iterative reasoning operations such as for-loops. The WiM approach may simulate going through the context twice and can enhance the final answer quality by aggregating all interconnected facts in one place at the end of the document or the context. MultiHop-RAG and HotPotQA were selected as representative benchmarks. MultiHop-RAG comprises a large collection of multi-hop queries derived from English news articles. A subset of 100 longest examples was selected within the range of 13k-33k tokens. Similarly, 100 samples from HotPotQA, consisting of Wikipedia-based multi-hop queries, were selected. The long context retrieval scenario was simulated by extending the context to three length variants: 16k, 32k, 64k.

Both tasks, i.e., needle retrieval and single-hop question answering can be treated as filter-style benchmarks under long-context conditions, wherein the objective was to eliminate irrelevant information and copy or transform the relevant content. The reduction in context using WiM inference pattern is in fact reverse engineering of how filter-type benchmarks are created. The model is asked to filter out injected distractions and copy over relevant parts into the margins 125 in each segment-wise prediction step. As representative of these tasks, a subset of 100 examples from SQUAD were selected for evaluation, with context lengths extended to 16k, 32k and 64k tokens.

Aggregation tasks assessed the models' ability to gather and combine relevant information dispersed across distant segments or long-context. The performance of the WiM inference in aggregation tasks can be related to the concept of hierarchical reductions, wherein final answers are derived by iteratively summarizing intermediate segment-level outputs. The common words extraction (CWE) benchmark was used, where words were sampled from discrete distributions, with the number of common words fixed and increasing with the sequence length number of uncommon words. Hundred examples of average length 64k tokens were generated by adjusting the original distributions. The original frequencies of common and uncommon words were scaled to match the extended length of samples. Common words appeared 500 times in the sample, while the frequency of uncommon words was capped at 50 occurrences. The task instructions were modified to explicitly include word frequency statistics to support aggregation over segments.

Further, the original tasks prompt structure was maintained. In all cases, the prompt for the Long Context LLM baseline can be expressed as:

```
{instruction_prefix}
```text
{context}
``` {instruction_suffix}
{query}
```

Where instruction_prefix and instruction_suffix were the task instruction appended before and after the main context, respectively. In the RAG approach, the original prompt was used with a modified context consisting of all relevant segments concatenated using newline characters. In the WiM inference pattern, all constructed prompts shared a common prefix:

~~~~
{instruction_prefix}
```text
{context}
```
~~~~

The shared common prefix was necessary for the efficient reuse of the KV-cache 105. To ensure that predictions were comparable, a single prompt yielding the highest-quality results was manually selected for the margin generation and final prediction steps for all evaluated models.

For each intermediate context $\sigma_i$ (where context=$\Sigma_i\sigma^i$) and the instruction 115 I, the following margin prompt $I_A$ was used to generate a margin note $M_i$:

~~~~
I_A = """
{instruction_prefix}
```text
{context_i}
```
Copy over all context relevant to the query: {query}
Provide the answer in the format: <YES/NO>#<Relevant context>.
Here are rules:
- If you do not know how to answer the query - start your answer
with NO#
- If the text is not related to the query - start your answer
with NO#
- If you can extract relevant information - start your answer
with YES#
- If the text does not mention the person by name - start your
answer with NO#
Example answers:
- YES# Western philosophy originated in Ancient Greece in the
6th century BCE with the pre-Socratics.
- NO# No relevant context.
"""
~~~~

In the experiments, the margin generation step was combined with the classification step and the first token generated was a class label. The generation of a margin was conditioned based on the first token; i.e., the generation was continued only if the first token was YES. Additionally, the prompt included an explanation or rules designed to enforce specific formatting and to prevent the model from inserting comments before delivering its judgment.

To distinguish the content of the margins 125 from the original context, and to maintain the document's logic and structure, the writing-in-the-margins strategy was explicitly named in the last step, while aggregating all relevant margin notes. Two variants of the prompt were used, depending on the number of retrieved margins. For single relevant margin, the following prompt is used.

~~~~
{instruction_prefix}
```text
{context}
```
I asked my assistant to read and analyze the above content page
by page to help you complete this task. This is a margin note
left on the last page:
```text
QUERY: {query}
ANSWER: {M_i}
``` Read again the note(s) and the provided content, take a deep
breath, and answer the query.
~~~~

-continued

~~~~
{instruction_suffix}
{query}
~~~~

In case of multiple margins, the following prompt is used.

~~~~
{instruction_prefix}
```text
{context}
```
I asked my assistant to read and analyze the above content page
by page to help you complete this task. Those are margin notes
left on each page:
```text
Page 0:
QUERY: {query}
ANSWER: {M_i}
Page 1:
QUERY: {query}
ANSWER: {M_j}
``` Read again the note(s) and the provided content, take a deep
breath, and answer the query.
{instruction_suffix}
{query}
~~~~

The term "segment" was replaced with "page" to more closely replicate the human practice of writing in the margins. In the experiments, there was no relationship between the order of the segments and the page numbers.

The results for the Multi-hop reasoning benchmarks such as HotPotQA and MultiHop RAG are summarized in TABLE 2 and TABLE 3, respectively. It can be observed from TABLE 2 that the WiM inference pattern enhances performance, particularly in terms of accuracy and speed, across nearly all tested models and sample sizes, with substantial improvements observed in smaller models. Similarly, based on the results in TABLE 3, WiM consistently outperforms both RAG and Long Context LLM models, demonstrating enhanced multi-hop reasoning abilities. In general, the application of the Writing in the Margins (WiM) inference pattern was found to improve multi-hop reasoning capabilities across nearly all evaluated models. Better performance gains were observed in smaller models, specifically Phi-3-small-128k-instruct, Qwen2-7B-Instruct, and Meta-Llama-3.1-8B-Instruct. These models exhibited improvements ranging from 0.10 to 0.14 on the HotPotQA benchmark, and up to 0.31 on the MultiHop-RAG benchmark.

TABLE 2

HotpotQA benchmark scores.

| | | | Context Length | | |
|---|---|---|---|---|---|
| Model Name | Task | Pattern | 16k | 32k | 64k |
| Phi-3-small-128k-instruct | HotpotQA | LLM | 0.48 | 0.45 | 0.67 |
| | | RAG | 0.55 | 0.52 | 0.33 |
| | | WiM | 0.63 | 0.64 | 0.67 |
| Qwen2-7B-Instruct | HotpotQA | LLM | 0.51 | 0.49 | 0.35 |
| | | RAG | 0.46 | 0.46 | 0.46 |
| | | WiM | 0.61 | 0.59 | 0.51 |
| Meta-Llama-3.1-8B-Instruct | HotpotQA | LLM | 0.57 | 0.55 | 0.5 |
| | | RAG | 0.59 | 0.56 | 0.51 |
| | | WiM | 0.71 | 0.67 | 0.7 |
| Phi-3-medium-128k-instruct | HotpotQA | LLM | 0.52 | 0.48 | 0.44 |
| | | RAG | 0.44 | 0.5 | 0.47 |
| | | WiM | 0.53 | 0.6 | 0.52 |

TABLE 2-continued

HotpotQA benchmark scores.

| Model Name | Task | Pattern | Context Length 16k | 32k | 64k |
|---|---|---|---|---|---|
| Meta-Llama-3.1-70B-Instruct | HotpotQA | LLM | 0.67 | 0.64 | 0.56 |
| | | RAG | 0.6 | 0.62 | 0.55 |
| | | WiM | 0.68 | 0.67 | 0.61 |
| Qwen2-72B-Instruct | HotpotQA | LLM | 0.64 | 0.61 | 0.49 |
| | | RAG | 0.57 | 0.53 | 0.58 |
| | | WiM | 0.69 | 0.75 | 0.66 |
| Palmyra-4-Chat-128K | HotpotQA | LLM | 0.62 | 0.59 | 0.59 |
| | | RAG | 0.52 | 0.59 | 0.62 |
| | | WiM | 0.63 | 0.61 | 0.69 |

TABLE 3

MultiHop RAG benchmark scores.

| Model Name | Task | Pattern | Context Length | Score |
|---|---|---|---|---|
| Phi-3-small-128k-instruct | MultiHop RAG | LLM | 13-32k | 0.78 |
| | | RAG | 13-32k | 0.72 |
| | | WiM | 13-32k | 0.94 |
| Qwen2-7B-Instruct | MultiHop RAG | LLM | 13-32k | 0.83 |
| | | RAG | 13-32k | 0.77 |
| | | WiM | 13-32k | 0.96 |
| Meta-LLaMA-3.1-8B-Instruct | MultiHop RAG | LLM | 13-32k | 0.82 |
| | | RAG | 13-32k | 0.74 |
| | | WiM | 13-32k | 0.88 |
| Phi-3-medium-128k-instruct | MultiHop RAG | LLM | 13-32k | 0.78 |
| | | RAG | 13-32k | 0.75 |
| | | WiM | 13-32k | 0.93 |
| Meta-LLaMA-3.1-70B-Instruct | MultiHop RAG | LLM | 13-32k | 0.88 |
| | | RAG | 13-32k | 0.77 |
| | | WiM | 13-32k | 0.84 |
| Qwen2-72B-Instruct | MultiHop RAG | LLM | 13-32k | 0.87 |
| | | RAG | 13-32k | 0.76 |
| | | WiM | 13-32k | 0.9 |
| Palmyra-4-Chat-128K | MultiHop RAG | LLM | 13-32k | 0.84 |
| | | RAG | 13-32k | 0.76 |
| | | WiM | 13-32k | 0.87 |

Figure 9:
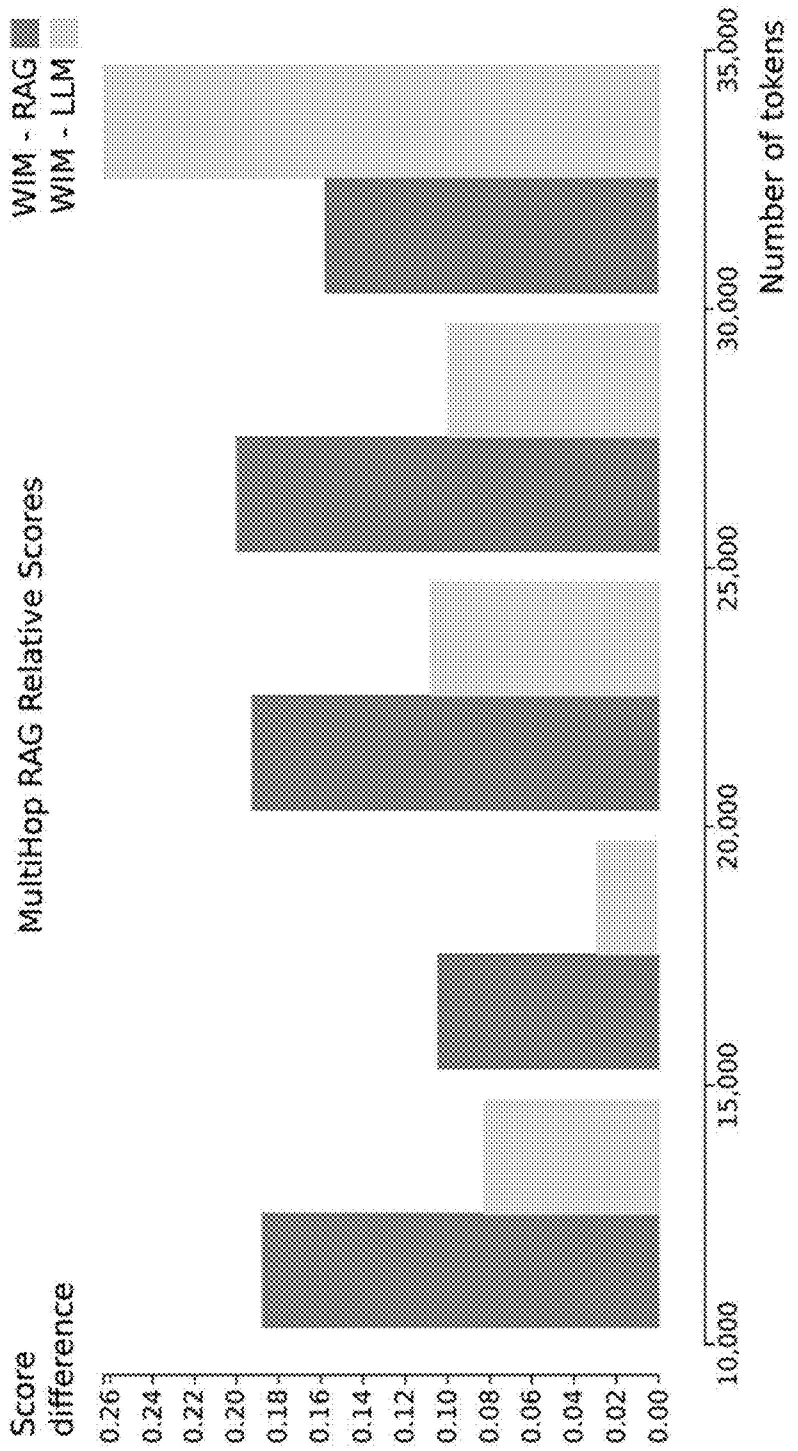
FIG. 9 illustrates relative score differences between the WiM and both the RAG and the long context LLM baselines on the MultiHop-RAG benchmark in accordance with an example implementation of the present disclosure.

FIG. 9 illustrates the relative score differences between WiM and both the RAG and Long Context LLM baselines on the MultiHop-RAG benchmark in accordance with an example implementation of the present disclosure. While the improvements over RAG remained consistent across configurations, the relative advantage of WiM over the Long Context LLM baseline increased with longer context window lengths. This observation supports the hypothesis that the ability of transformer-based models to execute complex reasoning tasks may degrade as the input sequence length increases.

Results for the SQUAD benchmark, covering both needle retrieval and single-hop question answering, are reported in TABLE 4. Results indicate similar performance across inference patterns for simpler tasks. Best inference pattern depends on the model choice. No dominant inference pattern or clear winner is observed across all models for this task category, as all results are spread around similar values. Performance metrics are generally found to be closely clustered, suggesting that task complexity may be insufficient to distinguish between inference patterns. However, model-specific differences are noted. The Qwen2-72B-Instruct model can yield improvements of up to 0.14 in score when used with the WiM pattern. The RAG method is found to be more effective for Qwen2-7B-Instruct, whereas Palmyra-4-Chat-128K achieves its highest scores when using the Long Context LLM approach.

TABLE 4

SQuAD benchmark scores.

| Model Name | Task | Pattern | Context Length 16k | 32k | 64k |
|---|---|---|---|---|---|
| Phi-3-small-128k-instruct | SQuAD | LLM | 0.79 | 0.62 | 0.71 |
| | | RAG | 0.82 | 0.56 | 0.68 |
| | | WiM | 0.76 | 0.75 | 0.7 |
| Qwen2-7B-Instruct | SQuAD | LLM | 0.76 | 0.7 | 0.53 |
| | | RAG | 0.83 | 0.81 | 0.81 |
| | | WiM | 0.81 | 0.81 | 0.74 |
| Meta-Llama-3.1-8B-Instruct | SQuAD | LLM | 0.86 | 0.88 | 0.84 |
| | | RAG | 0.84 | 0.88 | 0.87 |
| | | WiM | 0.89 | 0.88 | 0.78 |
| Phi-3-medium-128k-instruct | SQuAD | LLM | 0.79 | 0.71 | 0.65 |
| | | RAG | 0.8 | 0.78 | 0.81 |
| | | WiM | 0.79 | 0.8 | 0.76 |
| Meta-Llama-3.1-70B-Instruct | SQuAD | LLM | 0.88 | 0.83 | 0.85 |
| | | RAG | 0.89 | 0.9 | 0.93 |
| | | WiM | =0.87 | 0.87 | 0.79 |
| Qwen2-72B-Instruct | SQuAD | LLM | 0.88 | 0.76 | 0.71 |
| | | RAG | 0.88 | 0.86 | 0.89 |
| | | WiM | 0.89 | 0.9 | 0.87 |
| Palmrya-4-Chat-128K | SQuAD | LLM | 0.74 | 0.69 | 0.74 |
| | | RAG | 0.64 | 0.61 | 0.68 |
| | | WiM | 0.7 | 0.69 | 0.74 |

Aggregation task outcomes, based on the common words extraction (CWE) benchmark, are reported in TABLE 5. Across the majority of models, the WiM inference pattern either matches or substantially boosts baseline performance, demonstrating its strength in scenarios involving distributed evidence accumulation, such as summarization-like tasks. Analysis of failure cases in CWE revealed notable behavior in models such as Meta-Llama-3.1-8B-Instruct and Meta-Llama-3.1-70B-Instruct, which showed the highest performance improvements. These models frequently attempted to solve the problem by generating Python code, often concluding with incorrect or generic responses. Attempts to suppress code generation by prepending clarifying instructions did not yield meaningful improvement. Furthermore, adding a one-shot prompt often resulted in models analyzing the example instead of the context. For other models, the improvement on CWE is smaller but consistent in favor of WiM pattern.

TABLE 5

Common words extraction (CWE) benchmark scores.

| Model name | Task | Pattern | Context Length | Score |
|---|---|---|---|---|
| Phi-3-small-128k-instruct | CWE | baseline | 64k | 0.7 |
| | | RAG | 64k | 0.6 |
| | | WiM | 64k | 0.73 |
| Qwen2-7B-Instruct | CWE | baseline | 64k | 0.5 |
| | | RAG | 64k | 0.52 |
| | | WiM | 64k | 0.69 |
| Meta-Llama-3.1-8B-Instruct | CWE | Baseline | 64k | 0.22 |
| | | RAG | 64k | 0.48 |
| | | WiM | 64k | 0.94 |
| Phi-3-medium-128k-instruct | CWE | baseline | 64k | 0.92 |
| | | RAG | 64k | 0.92 |
| | | WiM | 64k | 0.9 |
| Meta-Llama-3.1-70B-Instruct | CWE | baseline | 64k | 0.35 |
| | | RAG | 64k | 0.64 |
| | | WiM | 64k | 0.93 |
| Qwen2-72B-Instruct | CWE | baseline | 64k | 0.37 |
| | | RAG | 64k | 0.76 |
| | | WiM | 64k | 0.98 |

TABLE 5-continued

Common words extraction (CWE) benchmark scores.

| Model name | Task | Pattern | Context Length | Score |
|---|---|---|---|---|
| Palmyra-4-Chat-128K | CWE | baseline | 64k | 0.52 |
| | | RAG | 64k | 0.54 |
| | | WiM | 64k | 0.59 |

Two variants of the disclosed Writing in the Margins (WiM) inference pattern were evaluated on the MultiHop-RAG benchmark to assess the impact of margin filtering.

In the first variant, denoted as no margins filtering, the margins classifier component was removed from the WiM pipeline. In this configuration, all extractive summaries were directly appended to the context without classification. The following query from the MultiHop-RAG benchmark was selected for analysis:

"query": "Which company, recently subjected to an antitrust lawsuit mentioned by The Sydney Morning Herald and discussed by sellers on CNBC|World Business News Leader as providing life-changing opportunities, also introduced invite-only deals reported by Wired to enhance the experience of its Prime members during sales events?"

The correct target answer for this query was "Amazon."

Using the Meta-Llama-3.1-8B-Instruct model, the generated margins (after removing the classification token) were listed below in the order of generation and insertion:

"all_summaries": [

"Amazon was recently subjected to an antitrust lawsuit mentioned by The Sydney Morning Herald and discussed by sellers on CNBC|World Business News Leader as providing life-changing opportunities. Amazon also introduced invite-only deals reported by Wired to enhance the experience of its Prime members during sales events.", "I don't know.", "I don't know. The page content does not mention any company that was recently subject to an antitrust lawsuit, nor does it mention The Sydney Morning Herald or CNBC|World Business News Leader. It appears to be a list of deals and products available during Prime Day, but it does not contain any information relevant to the query."]

The correct answer to the query is located in the first margin, while subsequent margins contained contradictory or uninformative content. In this case, the model failed to resolve the query correctly, whereas both the baseline approach and the WiM pattern with margin filtering successfully retrieved the correct answer. It was hypothesized that the model's performance degraded due to exposure to conflicting information. As shown in TABLE 6, this unfiltered configuration resulted in a performance drop of up to 0.08 compared to the original WiM pipeline. This degradation may be analogous to instruction interference, where extraneous information functions similarly to adversarial prompts. In conclusion, filtering margins—especially when combined with the margin generation step—not only saves computation by allowing irrelevant margins to be dropped but also improves the overall performance. Thus, classification and removal of irrelevant margins yield better results for MultiHop-RAG benchmark.

TABLE 6

Ablation study: Filtering margins.

| Model Name | Filtered (WiM) | All |
|---|---|---|
| Phi-3-small-128k-instruct | 0.94 | 0.94 |
| Qwen2-7B-Instruct | 0.96 | 0.9 |
| Meta-Llama-3.1-8B-Instruct | 0.88 | 0.8 |
| Phi-3-medium-128k-instruct | 0.93 | 0.93 |
| Meta-Llama-3.1-70B-Instruct | 0.84 | 0.85 |
| Qwen2-72B-Instruct | 0.9 | 0.87 |
| Palmyra-4-Chat-128K | 0.87 | 0.8 |

Another variant or appealing option of WiM inference pattern is to reduce computational demands by entirely eliminating the KV-cache 105 in the final step and relying solely on the extracted positive margins (or relevant margins). This approach may transform the long context document into a compressed, query-specific summary. While this method may be expected to result in performance degradation due to the loss of the full context. However, prior findings (as described above) also suggested that longer input sequences may negatively affect performance in complex reasoning tasks.

TABLE 7 presents the quantitative results for the MultiHop-RAG benchmark under this variant. It is observed that combining both the extracted margins and the full document produced the highest scores for nearly all evaluated models, with the exception of Meta-Llama-3.1-70B-Instruct. In contrast, employing a query-based extractive summary or more specifically, using only the content from the margins led to a consistent decrease in performance across all models, with reductions ranging from 0.01 to 0.17. These observations suggest that margin-only processing may not be optimal for reasoning-intensive tasks. However, for tasks focused on filtering or recall enhancement—particularly when models are specifically fine-tuned for margin generation and classification—the use of margins as isolated context may prove beneficial, since irrelevant content is already filtered or removed. Hence, utilizing both margins and the entire context yields the best results despite the declining performance of the underlying model when faced with increasing input lengths.

TABLE 7

Ablation study: Content compression.

| Model Name | Only Margins | Only Context | Margins + Context (WiM) |
|---|---|---|---|
| Phi-3-small-128k-instruct | 0.78 | 0.78 | 0.94 |
| Qwen2-7B-Instruct | 0.79 | 0.83 | 0.96 |
| Meta-Llama-3.1-8B-Instruct | 0.84 | 0.82 | 0.88 |
| Phi-3-medium-128k-instruct | 0.81 | 0.78 | 0.93 |
| Meta-Llama-3.1-70B-Instruct | 0.83 | 0.88 | 0.84 |
| Qwen2-72B-Instruct | 0.78 | 0.87 | 0.9 |
| Palmyra-4-Chat-128K | 0.76 | 0.84 | 0.87 |

According to some aspects of the present disclosure, the WiM inference pattern is designed to enhance the final benchmark performance and the overall user experience. One key design objective is to improve transparency in the decision-making process of large language models (LLMs). By surfacing intermediate computational outputs, i.e., margins or margin notes, WiM can make the reasoning process observable. This transparency may facilitate the model interpretability, support debugging, and provide actionable insights to both end users and system developers, thereby increasing the reliability and comprehensibility of outputs.

Figure 10:
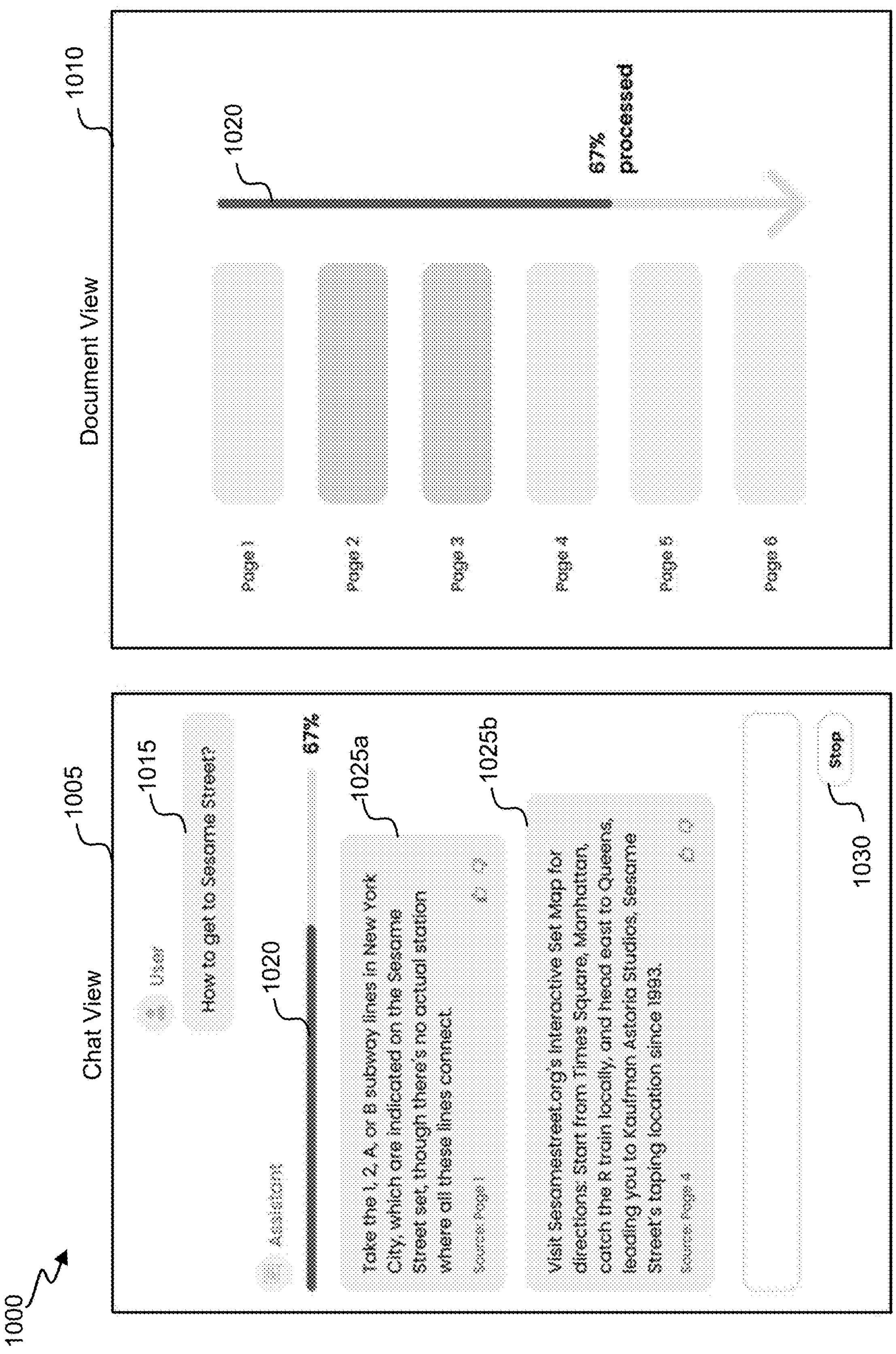
FIG. 10 illustrates an interactive retrieval interface based on the WiM in accordance with some embodiments of the present disclosure.

FIG. 10 illustrates an interactive retrieval interface based on the WiM design in accordance with some embodiments of the present disclosure. The interface is divided into two primary views: a chat view 1005 and a document view 1010. The chat view 1005 displays a user query 1015, a progress indicator 1020 representing a portion of the document that has been processed, and streamed margin responses (1025*a*, 1025*b*) generated by the LLM. Each response is associated with a document segment (or page) and may be labeled by the user via approval controls (e.g., thumbs up/down). A stop button 1030 is also included to enable early termination of the inference process by the user.

The document view 1010 presents a vertical progression of document segments labeled Page 1 through Page 6, along with the progress indicator 1020 showing the percentage of processed content. Each document segment may be visually annotated to reflect relevance to the user query 1015 as identified by the LLM. The processed and relevant segments are visually distinguished, for example, Page 5 and Page 6 have not yet processed, Page 1 and Page 4 represent relevant segments, and Pages 2-3 correspond to irrelevant segments with respect to the user query 1015. User interactions including upvote/downvote feedback on individual margins can influence the final model output, enabling real-time feedback and improving response relevance.

WiM also addresses the latency issues typically associated with long-context processing. While processing lengthy documents, traditional inference patterns may introduce response delays, often leaving users without feedback during extended computation periods. WiM mitigates this issue by enabling segment-wise processing and presenting relevant content incrementally. This includes a real-time display of margins (1025*a*, 1025*b*) and a visual progress bar (e.g., the progress indicator 1020), which may collectively reduce perceived latency and improve user engagement during inference.

An early exit mechanism is also incorporated into the WiM design, allowing users to terminate inference as soon as a satisfactory answer is found in any of the displayed margins. This feature is particularly advantageous in question answering tasks, where the user or system can halt processing once the target information is located. Empirical evaluation of the Meta-Llama-3.1-8B-Instruct model on the BABILong benchmark indicates that inference can be stopped after only 68% of the document segments have been processed, without compromising the correctness of the final answer.

The disclosed WiM design can also support a human-in-the-loop paradigm. During inference, users may be presented with the streamed margins (1025*a*, 1025*b*) and can annotate the margins 125 (e.g., using thumbs-up or thumbs-down indicators) to provide feedback on the margins relevance. This feedback may then be incorporated into the final answer generation. In this design, the final answer generation may consider both the full context and the user-labeled margins. In some instances, the model may assign more weight to the user-labeled margins. This interactive mechanism can enable refinement of the output based on the human judgment and can improve alignment with the user intent. An overview of this feedback loop is also provided in FIG. 10.

The present disclosure discloses WiM inference pattern that leverages chunked prefill operations to produce extractive summaries with minimal additional computational cost, emulating the human behavior of making notes in the margins. The WiM design substantially boosts the performance of off-the-shelf models across various tasks such as long-context, retrieval-oriented tasks, including QA, multi-hop reasoning, and aggregation. Remarkably, the WiM technique does not need finetuning for different types of tasks. WiM is compatible with transformer architectures and offers enhancements in both model performance and user experience. By streaming margins (intermediate extractive summaries) during inference, the pattern increases transparency, reduces latency, and enables early exit strategies. These features further facilitate human-in-the-loop interactions, offering a pathway for adaptive, real-time refinement of model outputs.

Figure 11:
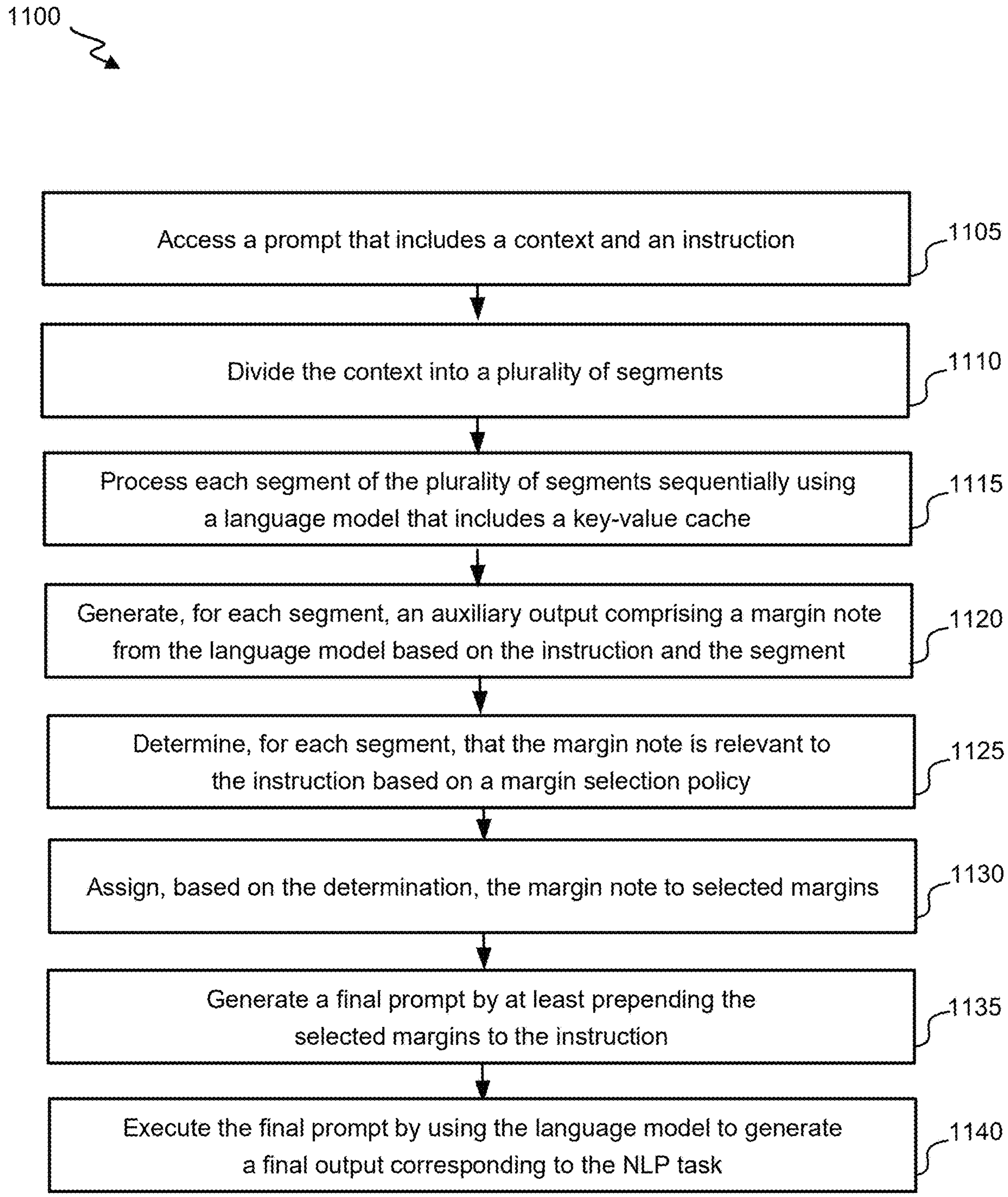
FIG. 11 shows an example flowchart of a system performing the WiM inference pattern in accordance with some embodiments of the present disclosure.

FIG. 11 shows an example flowchart of a system performing writing in margins (WiM) inference in accordance with some embodiments of the present disclosure. The blocks in flowchart are illustrated in a specific order, while the order can be modified, for example, some blocks may be performed before others, and some blocks may be performed simultaneously. The blocks can be performed by hardware or software or a combination thereof. The process at block 1105 may include accessing a prompt. The prompt may include a context (or the long context 110) and an instruction 115. The instruction 115 may correspond to a query associated with a natural language processing (NLP) task. The NLP task may correspond to one or more of multi-hop reasoning, retrieval-based answering, aggregation, and the like.

Further, the context may be divided into a plurality of segments. Each segment may correspond to a portion of the context, at block 1110. Each segment of the plurality of segments may be processed sequentially using a language model that includes the KV-cache 105, at block 1115. The KV-cache 105 can be used to maintain a causal flow of processed tokens. The processing of each segment of the plurality of segments sequentially may correspond to chunked prefill of the KV-cache 105.

In some instances, a segment-wise processing of the plurality of segments and a final prompt may occur in a single instance of the language model without resetting or reinitializing the KV-cache 105. The KV-cache 105 may be updated incrementally based on the segment-wise processing of the plurality of segments and the KV-cache 105 can be reused during generation of a final output based on the final prompt.

According to some embodiments, the language model can be a transformer-based LLM supporting long-context inference. The transformer-based LLM may include off-the-shelf models. The off-the-shelf models may include but are not limited to Phi, Qwen, Llama. Further, the model is used in inference mode (i.e., no fine-tuning or retraining), and hence, the model parameters may not change during the inference process.

During chunked prefill the KV-cache 105, an auxiliary output, for each segment of the plurality of segments, may be generated from the language model based on the instruction 115 and the segment, at block 1120. The auxiliary output may be comprised of a margin note that may represent intermediate extractive summary or relevance assessment. The auxiliary output may further comprise a classification label of the margin note. In some instances, the classification label may correspond to a 'Yes' token or a 'No' token and that is generated based on a relevance of the margin note with the instruction 115. In some other instances, the classification label may include a binary value. Moreover, in some instances, the margin note and the classification label may be generated using a same instance of the language model (or the transformer-based LLM).

The process at block 1125 may include determining that the margin note is relevant to the instruction 115 based on a margin selection policy. The margin selection policy may include selecting the margin note if a relevance score of the margin note exceeds a predefined threshold. Moreover, the relevance score may be assigned to the margin note by using a classifier. In some instances, the same instance of the language model that generates the margin note may be utilized (as the classifier) to assign the relevance score to the margin note. Furthermore, the margin selection policy may also select the margin note based on the classification label in the auxiliary output.

Based on the determination that the margin note is relevant to the instruction 115, the margin note may be assigned to selected margins 130, at block 1130. The selected margins 130 may be retained for final inference based on a final prompt. The selected margins 130 may comprise one or more intermediate extractive summaries (or the margins notes) of the long context 110 that may guide the language model in generating the final output, without modifying internal weights of the language model.

After segment-wise processing of each segment of the plurality of segments, a final prompt may be generated by at least prepending the selected margins 130 to the instruction 115, at block 1135. In some instances, for generation of the final prompt, the selected margins 130 and the instruction 115 may be appended to a final segment of the context (or the long context 110). In some other instances, only the selected margins 130 may be prepended to the instruction 115.

Finally, at block 1140, the final prompt may be executed by using the language model to generate a final output corresponding to the NLP task associated with the instruction 115. The final output may be provided to a user via a user interface running on a computing device.

Figure 12:
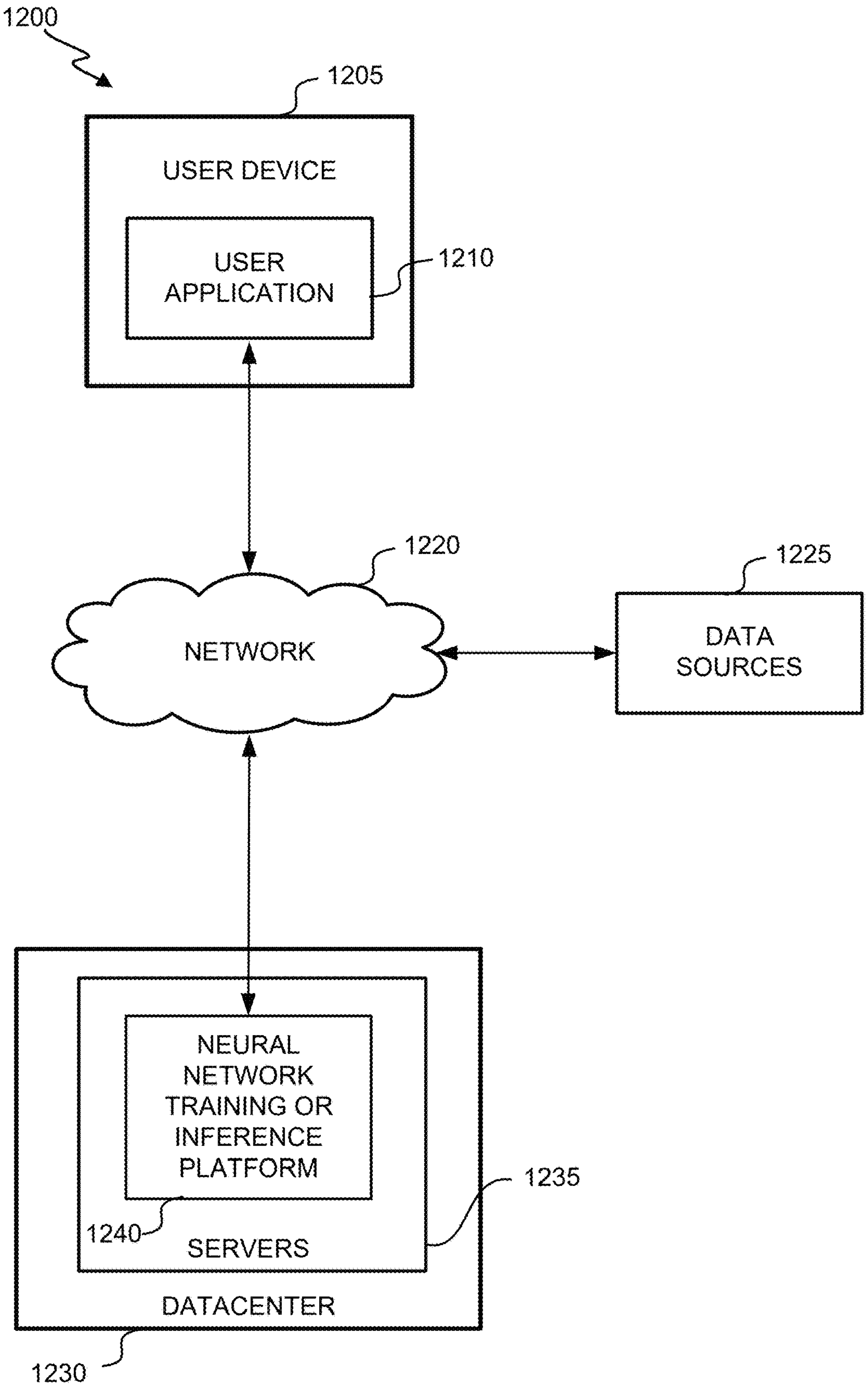
FIG. 12 is a block diagram of an example of a computing system which includes a neural network inference or training platform that may implement techniques in accordance with the present disclosure.

FIG. 12 is a block diagram of an example of a computing system 1200 which includes a neural network inference or training platform 1240 to implement the disclosed WiM technique. The neural network inference or training platform 1240 may include software that can implement a neural network architecture and software that enables training of the neural network implementation or inference of an output sequence by processing an input sequence through the neural network implementation. A user of the neural network inference or training platform 1240 such as a user of a user device 1205, can use or configure a question answer platform to train a neural network implementation or perform sequence modeling tasks (e.g., inference) using the neural network implementation. Data sources 1225 may be utilized to obtain training data to train the neural network implementation or to obtain input sequences to infer output sequences using the neural network implementation.

The user device 1205 is a computing device capable of accessing the neural network inference or training platform 1240 over the network 1220, which may be or include, for example, the Internet, a local area network (LAN), a wide area network (WAN), a virtual private network (VPN), or another public or private means of electronic computer communication. For example, the user device 1205 may be a mobile phone, a tablet computer, a laptop computer, a notebook computer, a desktop computer, or another suitable computing device. In some cases, the user device 1205 may be registered to or otherwise associated with a customer of the neural network inference or training platform 1240. The neural network inference or training platform 1240 may be created and/or operated by a service provider and may have one or more customers, which may each be a public entity, private entity, or another corporate entity or individual that purchases or otherwise uses software services of the neural network inference or training platform 1240. Without limitation, the neural network inference or training platform 1240 can support hundreds or thousands of customers, and each of the customers may be associated with one or more user devices, such as the user device 1205.

The neural network inference or training platform 1240 is implemented using one or more servers 1235. The servers 1235 can each be a computing device or system, which can include one or more computing devices, such as a desktop computer, a server computer, or another computer capable of operating as a server, or a combination thereof. In some implementations, one or more of the servers 1235 can be a software implemented server implemented on a physical device, such as a hardware server. In some implementations, a combination of two or more servers 1235 can be implemented as a single hardware server or as a single software server implemented on a single hardware server.

For example, a server may run software services deliverable to user devices such as the user device 1205. For example, the servers may implement web server software to provide user access to perform inference or a training task using the neural network inference or training platform 1240.

In some implementations, the neural network inference or training platform 1240 may be on-premises software run at a site operated by a private or public entity or individual associated with the user device 1205. For example, the data sources 1225 may in whole or in part be sources available at that site and then network 1220 may be a LAN which connects the data sources 1225 with the servers 1235.

In some implementations, an instance of the neural network inference or training platform 1240 can be implemented in whole or in part in a public or private cloud including servers that provides compute, memory, network, and other resources as a service. For example, an instance may be used to provide inference or training services to a single customer (e.g., single-tenant) or multiple customers (e.g., multi-tenant). In the case where a multi-tenant configuration is utilized, technological measures may be put in place to prevent data related to one customer from being used for or disclosed to another customer.

The servers 1235 are located at a datacenter 1230. The datacenter 1230 can represent a geographic location, which can include a facility, where the one or more servers are located. The computing system 1200 can include a number of datacenters and servers or can include a configuration of datacenters and servers different from that generally illustrated in FIG. 12. For example, and without limitation, the computing system 1200 can include tens of datacenters, and at least some of the datacenters can include hundreds or another suitable number of servers. In some implementations, the datacenter 1230 can be associated or communicate with one or more datacenter networks or domains. In some implementations, such as where the neural network inference or training platform 1240 is on-premises software, the datacenter 1230 may be omitted.

The network 1220, the datacenter 1230, or another element, or combination of elements, of the computing system 1200 can include network hardware such as routers, switches, other network devices, or combinations thereof. For example, the datacenter 1230 can include a load balancer for routing traffic from the network 1220 to various ones of the servers 1235. The load balancer can route, or direct, computing communications traffic, such as signals or messages, to respective ones of the servers 1235. For example, the load balancer can operate as a proxy, or reverse proxy, for a service, such as a service provided to user devices such as the user device 1205 by the servers 1235. Routing functions of the load balancer can be configured directly or via a domain name service (DNS). The load balancer can coordinate requests from user devices and can simplify access to the neural network inference or training platform 1240 by masking the internal configuration of the datacenter 1230 from the user devices. In some implementations, the load balancer can operate as a firewall, allowing or preventing communications based on configuration settings. In some implementations, the load balancer can be located outside of the datacenter 1230, for example, when providing global routing for multiple datacenters. In some implementations, load balancers can be included both within and outside of the datacenter 1230.

Figure 13:
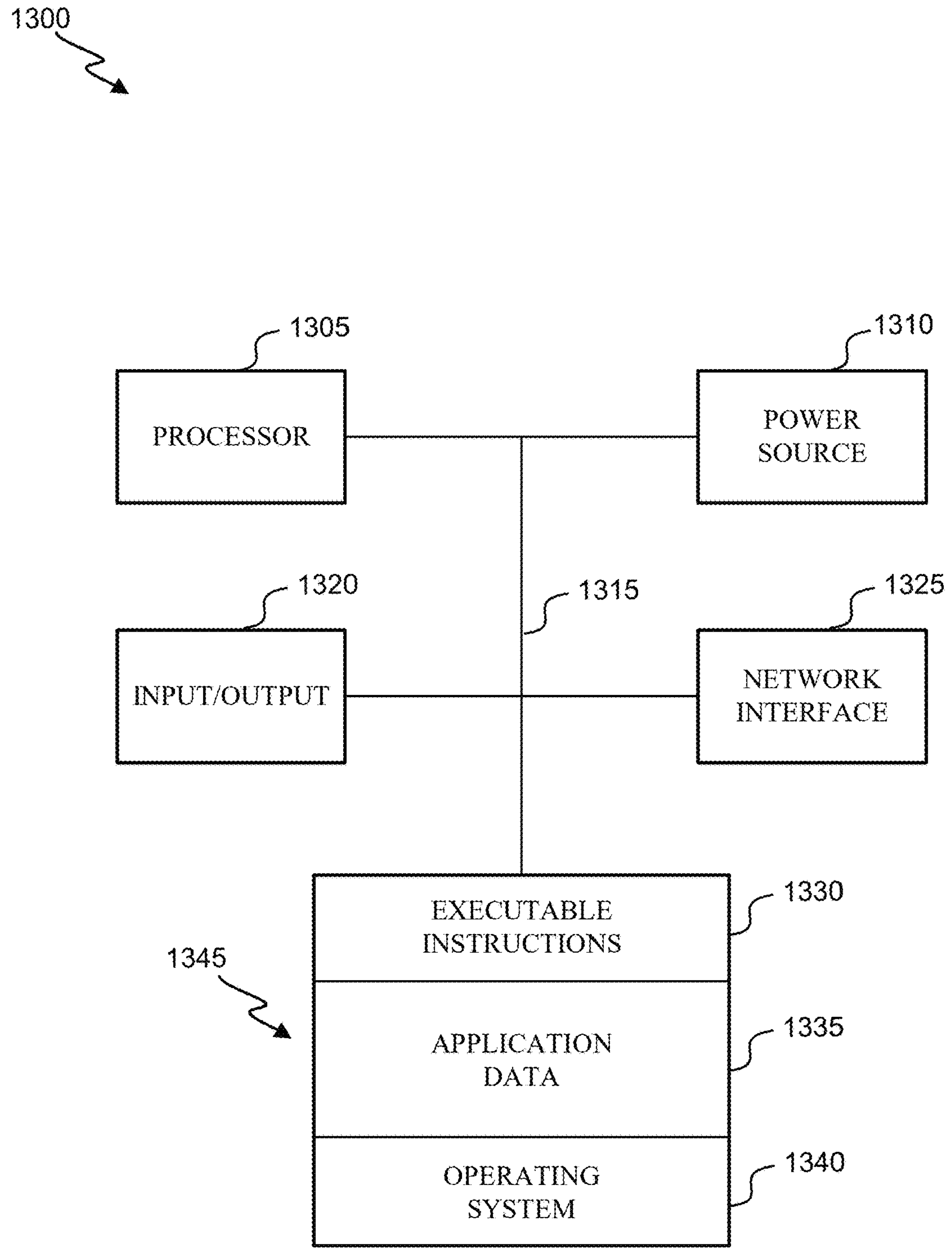
FIG. 13 is a block diagram of an example of an internal configuration of a computing device usable in a computing system according to implementations of this disclosure.

FIG. 13 is a block diagram of an example internal configuration of a computing device 1300 usable with a computing system, such as the computing system 1200 shown in FIG. 12. The computing device 1300 may, for example, implement one or more of the user devices or one of the servers 1235 of the computing system 1200 shown in FIG. 12.

The computing device 1300 includes components or units, such as a processor 1305, a memory 1345, a bus 1315, a power source 1310, input/output devices 1320, a network interface 1325, other suitable components, or a combination thereof. One or more of the memories 1345, the power source 1310, the input/output devices 1320, or the network interface 1325 can communicate with the processor 1305 via the bus 1315.

The processor 1305 may include a central processing unit, such as a microprocessor, and can include single or multiple processors having single or multiple processing cores. The processor 1305 may also include a GPU or TPU that is optimized to perform calculations needed to operate a language model. Alternatively, the processor 1305 can include another type of device, or multiple devices, now existing or hereafter developed, configured for manipulating or processing information. For example, the processor 1305 can include multiple processors interconnected in one or more manners, including hardwired or networked, including wirelessly networked. For example, the operations of the processor 1305 can be distributed across multiple devices or units that can be coupled directly or across a local area or other suitable type of network. The processor 1305 can include a cache, or cache memory, for local storage of operating data or instructions.

The memory 1345 includes one or more memory components, which may each be volatile memory or non-volatile memory. For example, the volatile memory of the memory 1345 can be random access memory (RAM) (e.g., a DRAM module, such as DDR SDRAM) or another form of volatile memory. In another example, the non-volatile memory of the memory 1345 can be a disk drive, a solid-state drive, flash memory, phase-change memory, or another form of non-volatile memory configured for persistent electronic information storage. Generally speaking, with currently existing memory technology, volatile hardware provides for lower latency retrieval of data and is more scarce (e.g., due to higher cost and lower storage density) and non-volatile hardware provides for higher latency retrieval of data and has greater availability (e.g., due to lower cost and high storage density). The memory 1345 may also include other types of devices, now existing or hereafter developed, configured for storing data or instructions for processing by the processor 1305. In some implementations, the memory 1345 can be distributed across multiple devices. For example, the memory 1345 can include network-based memory or memory in multiple clients or servers performing the operations of those multiple devices.

The memory 1345 can include data for immediate access by the processor 1305. For example, the memory 1345 can include executable instructions 1330, application data 1335, and an operating system 1340. The executable instructions 1330 can include one or more application programs, which can be loaded or copied, in whole or in part, from non-volatile memory to volatile memory to be executed by the processor 1305. For example, the executable instructions 1330 can include instructions for performing some or all of the techniques of this disclosure. The application data 1335 can include user data, database data (e.g., database catalogs or dictionaries), or the like. In some implementations, the application data 1335 can include functional programs, such as a web browser, a web server, a database server, another program, or a combination thereof. The operating system 1340 can be, for example, Microsoft Windows®, Mac OS X®, or Linux®; an operating system for a mobile device, such as a smartphone or tablet device; or an operating system for a non-mobile device, such as a mainframe computer.

The power source 1310 includes a source for providing power to the computing device 1300. For example, the power source 1310 can be an interface to an external power distribution system. In another example, the power source 1310 can be a battery, such as where the computing device 1300 is a mobile device or is otherwise configured to operate independently of an external power distribution system. In some implementations, the computing device 1300 may include or otherwise use multiple power sources. In some such implementations, the power source 1310 can be a backup battery.

The input/output devices 1320 include one or more input interfaces and/or output interfaces. An input interface may, for example, be a positional input device, such as a mouse, touchpad, touchscreen, or the like; a keyboard; or another suitable human or machine interface device. An output interface may, for example, be a display, such as a liquid crystal display, a cathode-ray tube, a light emitting diode display, or other suitable display.

The network interface 1325 provides a connection or link to a network (e.g., the network 1220 shown in FIG. 12). The network interface 1325 can be a wired network interface or a wireless network interface. The computing device 1300 can communicate with other devices via the network interface 1325 using one or more network protocols, such as using Ethernet, transmission control protocol (TCP), internet protocol (IP), power line communication, an IEEE 802.X protocol (e.g., Wi-Fi, Bluetooth, ZigBee, etc.), infrared, visible light, general packet radio service (GPRS), global system for mobile communications (GSM), code-division multiple access (CDMA), Z-Wave, another protocol, or a combination thereof.

The foregoing description of the computing device 1300 includes a number of components that may be found on a computer. However, depending on the implementation, some components may be added, deleted, or modified. For example, in some implementations, (e.g., such as with respect to the servers 1235), human interface devices (e.g., input/output devices 1320) may be omitted.

Techniques and systems of implementations of better inference patterns for long context retrieval, including pseudocode and instructions used in an example implementation are described and included in the attached documents.

Such techniques and systems may be implemented, for example, using the systems and devices described above with respect to FIG. 12.

The implementations of this disclosure can be described in terms of functional block components and various processing operations. Such functional block components can be realized by a number of hardware or software components that perform the specified functions. For example, the disclosed implementations can employ various integrated circuit components (e.g., memory elements, processing elements, logic elements, look-up tables, and the like), which can carry out a variety of functions under the control of one or more microprocessors or other control devices. Similarly, where the elements of the disclosed implementations are implemented using software programming or software elements, the systems and techniques can be implemented with a programming or scripting language, such as C, C++, Java, JavaScript, Python, Ruby, assembler, or the like, with the various algorithms being implemented with a combination of data structures, objects, processes, routines, or other programming elements.

Functional aspects can be implemented in algorithms that execute on one or more processors. Furthermore, the implementations of the systems and techniques disclosed herein could employ a number of traditional techniques for electronics configuration, signal processing or control, data processing, and the like. The words "mechanism" and "component" are used broadly and are not limited to hardware, mechanical or physical implementations, but can include software routines implemented in conjunction with hardware processors, etc. Likewise, the terms "system" or "tool" as used herein and in the figures, but in any event based on their context, may be understood as corresponding to a functional unit implemented using software, hardware (e.g., an integrated circuit, such as an application specific integrated circuit (ASIC)), or a combination of software and hardware. In certain contexts, such systems or mechanisms may be understood to be a processor-implemented software system or processor-implemented software mechanism that is part of or callable by an executable program, which may itself be wholly or partly composed of such linked systems or mechanisms.

Implementations or portions of implementations of the above disclosure can take the form of a computer program product accessible from, for example, a computer-usable or computer-readable medium. A computer-usable or computer-readable medium can be a device that can, for example, tangibly contain, store, communicate, or transport a program or data structure for use by or in connection with a processor. The medium can be, for example, an electronic, magnetic, optical, electromagnetic, or semiconductor device.

Other suitable mediums are also available. Such computer-usable or computer-readable media can be referred to as non-transitory memory or media and can include volatile memory or non-volatile memory that can change over time. The quality of memory or media being non-transitory refers to such memory or media storing data for some period or otherwise based on device power or a device power cycle. A memory of an apparatus described herein, unless otherwise specified, does not have to be physically contained by the apparatus, but is one that can be accessed remotely by the apparatus, and does not have to be contiguous with other memory that might be physically contained by the apparatus.

While the disclosure has been described in connection with specific implementations, it is to be understood that the disclosure is not to be limited to the disclosed implementations but, on the contrary, is intended to cover various modifications and equivalent arrangements included within the scope of the appended claims, which scope is to be accorded the broadest interpretation so as to encompass all such modifications and equivalent structures as is permitted under the law.

Some embodiments of the present disclosure include a system including one or more data processors. In some embodiments, the system includes a non-transitory computer-readable storage medium containing instructions which, when executed on the one or more data processors, cause the one or more data processors to perform part or all of one or more methods and/or part or all of one or more processes disclosed herein. Some embodiments of the present disclosure include a computer-program product tangibly embodied in a non-transitory machine-readable storage medium, including instructions configured to cause one or more data processors to perform part or all of one or more methods and/or part or all of one or more processes disclosed herein.

The terms and expressions which have been employed are used as terms of description and not of limitation, and there is no intention in the use of such terms and expressions of excluding any equivalents of the features shown and described or portions thereof, but it is recognized that various modifications are possible within the scope of the invention claimed. Thus, it should be understood that although the present invention as claimed has been specifically disclosed by embodiments and optional features, modification, and variation of the concepts herein disclosed may be resorted to by those skilled in the art, and that such modifications and variations are considered to be within the scope of this invention as defined by the appended claims.

The present description provides preferred exemplary embodiments only, and is not intended to limit the scope, applicability, or configuration of the disclosure. Rather, the description of the preferred exemplary embodiments will provide those skilled in the art with an enabling description for implementing various embodiments. It is understood that various changes may be made in the function and arrangement of elements without departing from the spirit and scope as set forth in the appended claims.

Specific details are given in the following description to provide a thorough understanding of the embodiments. However, it will be understood that the embodiments may be practiced without these specific details. For example, circuits, systems, networks, processes, and other components may be shown as components in block diagram form in order not to obscure the embodiments in unnecessary detail. In other instances, well-known circuits, processes, algorithms, structures, and techniques may be shown without unnecessary detail in order to avoid obscuring the embodiments.

What is claimed is:

1. A computer-implemented method comprising:

accessing a prompt, wherein the prompt includes a context and an instruction, and wherein the instruction corresponds to a query associated with a natural language processing (NLP) task;

dividing the context into a plurality of segments, wherein each segment corresponds to a portion of the context;

for each segment of the plurality of segments:

processing the segment sequentially using a language model that includes a key-value cache (KV-cache), wherein the KV-cache is used to maintain a causal flow of processed tokens;

generating an auxiliary output from the language model based on the instruction and the segment, wherein the auxiliary output comprises a margin note that represents intermediate extractive summary or relevance assessment;

determining that the margin note is relevant to the instruction based on a margin selection policy; and assigning, based on the determination that the margin note is relevant to the instruction, the margin note to selected margins, wherein the selected margins are retained for final inference;

generating a final prompt by at least prepending the selected margins to the instruction; and executing the final prompt by using the language model to generate a final output corresponding to the NLP task associated with the instruction.

2. The computer-implemented method of claim 1, wherein the auxiliary output further comprises a classification label of the margin note, wherein the classification label corresponds to a Yes token or a No token generated based on a relevance of the margin note with the instruction.

3. The computer-implemented method of claim 1, wherein the margin selection policy includes:

selecting the margin note if a relevance score of the margin note exceeds a predefined threshold, wherein the relevance score is assigned to the margin note by using a classifier; or selecting the margin note based on a classification label in the auxiliary output.

4. The computer-implemented method of claim 1, further comprising:

populating a user interface in real-time with one or more margin notes and/or a progress indicator of the NLP task; and receiving one or more user interactions through the user interface, wherein the one or more user interactions include an approval or a disapproval of the one or more margin notes.

5. The computer-implemented method of claim 1, wherein the margin selection policy further includes selecting the margin note corresponding to an approval from a user.

6. The computer-implemented method of claim 1, wherein the margin note and a classification label are generated using a same instance of the language model.

7. The computer-implemented method of claim 1, wherein the language model is a transformer-based Large Language Model (LLM) supporting long-context inference, and wherein the transformer-based LLM includes off-the-shelf models.

8. The computer-implemented method of claim 1, wherein the NLP task corresponds to one or more of multi-hop reasoning, retrieval-based answering, or aggregation.

9. The computer-implemented method of claim 1, wherein the selected margins comprise one or more intermediate extractive summaries that guide the language model in generating the final output, without modifying internal weights of the language model.

10. The computer-implemented method of claim 1, wherein processing each segment of the plurality of segments sequentially corresponds to chunked prefill of the KV-cache.

11. The computer-implemented method of claim 1, wherein processing each segment of the plurality of segments sequentially and the final prompt occurs in a single instance of the language model without resetting or reinitializing the KV-cache.

12. The computer-implemented method of claim 1, wherein the KV-cache is updated incrementally based on segment-wise processing of the plurality of segments and the KV-cache is reused during generation of the final output.

13. A system comprising:

one or more data processors; and a non-transitory computer-readable storage medium containing instructions which, when executed on the one or more data processors, cause the one or more data processors to perform a set of operations including:

accessing a prompt, wherein the prompt includes a context and an instruction, and wherein the instruction corresponds to a query associated with a natural language processing (NLP) task;

dividing the context into a plurality of segments, wherein each segment corresponds to a portion of the context;

for each segment of the plurality of segments:

processing the segment sequentially using a language model that includes a key-value cache (KV-cache), wherein the KV-cache is used to maintain a causal flow of processed tokens;

generating an auxiliary output from the language model based on the instruction and the segment, wherein the auxiliary output comprises a margin note that represents intermediate extractive summary or relevance assessment;

determining that the margin note is relevant to the instruction based on a margin selection policy; and assigning, based on the determination that the margin note is relevant to the instruction, the margin note to selected margins, wherein the selected margins are retained for final inference;

generating a final prompt by at least prepending the selected margins to the instruction; and executing the final prompt by using the language model to generate a final output corresponding to the NLP task associated with the instruction.

14. The system of claim 13, wherein the margin note and a classification label are generated using a same instance of the language model.

15. The system of claim 13, wherein the language model is a transformer-based LLM (large language model) supporting long-context inference, and wherein the transformer-based LLM includes off-the-shelf models.

16. The system of claim 13, wherein the NLP task corresponds to one or more of multi-hop reasoning, retrieval-based answering, or aggregation.

17. The system of claim 13, wherein processing each segment of the plurality of segments sequentially corresponds to chunked prefill of the KV-cache.

18. The system of claim 13, wherein the KV-cache is updated incrementally based on segment-wise processing of the plurality of segments and the KV-cache is reused during generation of the final output.

19. The system of claim 13, wherein the margin selection policy includes:

selecting the margin note if a relevance score of the margin note exceeds a predefined threshold, wherein the relevance score is assigned to the margin note by using a classifier; or selecting the margin note based on a classification label in the auxiliary output.

20. A computer-program product tangibly embodied in a non-transitory machine-readable storage medium, including instructions configured to cause one or more data processors to perform a set of operations comprising:

accessing a prompt, wherein the prompt includes a context and an instruction, and wherein the instruction corresponds to a query associated with a natural language processing (NLP) task;

dividing the context into a plurality of segments, wherein each segment corresponds to a portion of the context;

for each segment of the plurality of segments:

processing the segment sequentially using a language model that includes a key-value cache (KV-cache), wherein the KV-cache is used to maintain a causal flow of processed tokens;

generating an auxiliary output from the language model based on the instruction and the segment, wherein the auxiliary output comprises a margin note that represents intermediate extractive summary or relevance assessment;

determining that the margin note is relevant to the instruction based on a margin selection policy; and assigning, based on the determination that the margin note is relevant to the instruction, the margin note to selected margins, wherein the selected margins are retained for final inference;

generating a final prompt by at least prepending the selected margins to the instruction; and executing the final prompt by using the language model to generate a final output corresponding to the NLP task associated with the instruction.

* * * * *